(12) United States Patent
Li et al.

(10) Patent No.: US 12,198,404 B2
(45) Date of Patent: Jan. 14, 2025

(54) METHOD AND APPARATUS FOR OBTAINING POSE INFORMATION, METHOD AND APPARATUS FOR DETERMINING SYMMETRY OF OBJECT, AND STORAGE MEDIUM

(71) Applicant: HUAWEI TECHNOLOGIES CO., LTD., Guangdong (CN)

(72) Inventors: Er Li, Hangzhou (CN); Bo Zheng, Hangzhou (CN); Jianbin Liu, Hangzhou (CN); Jun Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 17/560,166

(22) Filed: Dec. 22, 2021

(65) Prior Publication Data

US 2022/0114746 A1 Apr. 14, 2022

Related U.S. Application Data

(63) Continuation of application No. PCT/CN2020/113637, filed on Sep. 5, 2020.

(30) Foreign Application Priority Data

Oct. 31, 2019 (CN) .......................... 201911051691.7
Dec. 6, 2019 (CN) .......................... 201911246611.3

(51) Int. Cl.
*G06V 10/762* (2022.01)
*G06T 7/68* (2017.01)
(Continued)

(52) U.S. Cl.
CPC .............. *G06V 10/762* (2022.01); *G06T 7/68* (2017.01); *G06T 7/70* (2017.01); *G06T 17/00* (2013.01); *G06V 10/761* (2022.01); *G06V 20/20* (2022.01)

(58) Field of Classification Search
CPC .... G06V 10/762; G06V 20/20; G06V 10/761; G06T 7/68; G06T 7/70; G06T 17/00
(Continued)

(56) References Cited

U.S. PATENT DOCUMENTS

2018/0268601 A1* 9/2018 Rad ...................... G06V 20/647

FOREIGN PATENT DOCUMENTS

| CN | 103733226 A | 4/2014 |
| CN | 104596486 A | 5/2015 |
| CN | 110148217 A | 8/2019 |

OTHER PUBLICATIONS

Corona, "Pose Estimation for Objects with Rotational Symmetry" (Year 2008), 2018 IEEE/RSJ International Conference on Intelligent Robots and Systems (IROS), Madrid, Spain, Oct. 1-5, 2018, pp. 7215-7222 (Year 2018).*

(Continued)

*Primary Examiner* — Hai Tao Sun

(57) ABSTRACT

This application relates to the field of pose detection technologies, and discloses a method and an apparatus for obtaining pose information, a method and an apparatus for determining symmetry of an object, and a storage medium. The method includes: obtaining a rotational symmetry degree of freedom of a target object (901), obtaining pose information of the target object (902), and adjusting the pose information of the target object based on the rotational symmetry degree of freedom to obtain adjusted pose information (903), where the adjusted pose information is used for displaying a virtual object, and the virtual object is an object associated with the target object.

10 Claims, 6 Drawing Sheets

(51) Int. Cl.
  *G06T 7/70* (2017.01)
  *G06T 17/00* (2006.01)
  *G06V 10/74* (2022.01)
  *G06V 20/20* (2022.01)
(58) Field of Classification Search
  USPC .......................................................... 345/427
  See application file for complete search history.

(56) References Cited

OTHER PUBLICATIONS

Yuval Litvak et al: "Learning a High-Precision Robotic Assembly Task Using Pose Estimation from Simulated Depth Images", arxiv.org, Cornell University Library, 201 Olin Library Cornell University Ithaca, NY 14853, Sep. 27, 2018 (Sep. 27, 2018), 8 Pages, XP081422239.

Jia Qingxuan et al: "Efficient Recognition for Non-Cooperative Target with Symmetric Feature", 2019 14th IEEE Conference on Industrial Electronics and Applications (ICIEA), IEEE, Jun. 19, 2019 (Jun. 19, 2019), pp. 927-931, XP033616492.

Enric Corona et al, Pose Estimation for Objects with Rotational Symmetry, 2018 IEEE/RSJ International Conference on Intelligent Robots and Systems (IROS) Madrid, Spain, Oct. 1-5, 2018, total 8 pages.

Bugra Tekin et al, Real-Time Seamless Single Shot 6D Object Pose Prediction, CVPR 2018, total 16 pages.

Qualcomm, 3D Object Detection, 2022, URL:https://www.qualcomm.com/research/projects/computer-vision/3d-object-detection, total 2 pages.

Yuval,Litvak et al, "Learning Pose Estimation for High-Precision Robotic Assembly Using Simulated Depth Images",Sep. 27, 2018, URL:https://arxiv.org/pdf/1809.10699,total 8 pages.

* cited by examiner

METHOD AND APPARATUS FOR OBTAINING POSE INFORMATION, METHOD AND APPARATUS FOR DETERMINING SYMMETRY OF OBJECT, AND STORAGE MEDIUM

CROSS-REFERENCE TO RELATED APPLICATIONS

This application is a continuation of International Application No. PCT/CN2020/113637, filed on Sep. 5, 2020, which claims priority to Chinese Patent Application No. 201911051691.7, filed on Oct. 31, 2019 and Chinese Patent Application No. 201911246611.3, filed on Dec. 6, 2019. All of the aforementioned patent applications are hereby incorporated by reference in their entireties.

TECHNICAL FIELD

This application relates to the field of pose detection technologies, and in particular, to a method and an apparatus for obtaining pose information, a method and an apparatus for determining symmetry of an object, and a storage medium.

BACKGROUND

Pose detection and tracking technologies for objects are key technologies in the field of environment understanding. The technologies can empower machines to perceive spatial positions and classes of objects in a real environment, and are widely used in fields such as autonomous driving and augmented reality. However, objects in the real environment have complex changes in sizes, shapes, materials, textures and geometric details. This poses a great challenge to the detection and tracking technologies for objects.

At present, many objects have rotational symmetry. Images obtained by photographing an object having rotational symmetry at different observation positions may be the same, and therefore poses of the object having rotational symmetry are indefinite. During pose detection and tracking, if no dedicated processing is performed on the object having rotational symmetry, it is difficult to effectively recognize a pose of the object.

SUMMARY

This application provides a method and an apparatus for obtaining pose information, a method and an apparatus for determining symmetry of an object, and a storage medium, to adaptively adjust pose information of a virtual object. The technical solutions are as follows.

According to a first aspect, a method for obtaining pose information is provided. According to the method, a rotational symmetry degree of freedom of a target object and pose information of the target object are obtained. Then, the pose information of the target object is adjusted based on the rotational symmetry degree of freedom to obtain adjusted pose information, where the adjusted pose information is used for displaying a virtual object, and the virtual object is an object associated with the target object. Further, the virtual object may be displayed based on the adjusted pose information.

It should be noted that, the rotational symmetry degree of freedom may be represented by N, where N is a natural number. The rotational symmetry degree of freedom equal to N indicates that an object that rotates by 360/N degrees around a rotational axis can completely coincide with the object before the rotation. The rotational symmetry degree of freedom equal to 0 indicates that the object that rotates by any angle around the rotational axis can completely coincide with the object before the rotation.

In this embodiment of this application, pose information of the virtual object can be adaptively adjusted based on the rotational symmetry degree of freedom of the target object, so that a virtual-real fusion display result may be displayed at an optimal display angle relative to a camera. This improves viewing experience of users.

In a first possible manner, the operation of obtaining a rotational symmetry degree of freedom of a target object may be as follows: obtaining an identifier of the target object, and using a rotational symmetry degree of freedom corresponding to the identifier of the target object as the rotational symmetry degree of freedom of the target object.

The rotational symmetry degree of freedom corresponding to the identifier of the target object may be obtained from a stored correspondence between an identifier of an object and a rotational symmetry degree of freedom based on the identifier of the target object.

In a second possible manner, the operation of obtaining a rotational symmetry degree of freedom of a target object may be as follows: obtaining a rotational symmetry degree of freedom of the target object input by a user.

In a third possible manner, the operation of obtaining a rotational symmetry degree of freedom of a target object may be as follows: obtaining an identifier of the target object, and then obtaining a three-dimensional (3D) model corresponding to the identifier of the target object; obtaining a plurality of two-dimensional (2D) images of the target object through rendering based on the 3D model; and obtaining the rotational symmetry degree of freedom of the target object by performing similarity calculation and clustering analysis on the plurality of 2D images.

It should be noted that the plurality of 2D images may be 2D views obtained by rendering the 3D model at different perspectives. Rendering perspectives of the plurality of 2D images may be different. A rendering perspective of each of the 2D images may include a first rendering angle and a second rendering angle. In a possible case, first rendering angles of the plurality of 2D images are different, and second rendering angles of the plurality of 2D images are the same.

In this embodiment of this application, whether the target object has rotational symmetry can be accurately identified, and the rotational symmetry degree of freedom of the target object can be obtained when the target object has rotational symmetry. This helps reduce difficulties in pose recognition for an object during pose detection and tracking, and improve accuracy of pose recognition for the object.

The operation of obtaining the rotational symmetry degree of freedom of the target object by performing similarity calculation and clustering analysis on the plurality of 2D images may be as follows: sampling the plurality of 2D images based on a plurality of rotational symmetry degrees of freedom, to obtain a plurality of image pairs; then, calculating similarities of all the plurality of image pairs first, and then performing clustering analysis on the plurality of image pairs based on the similarities and the rotational symmetry degrees of freedom, to obtain a plurality of image sets; determining an image set having a largest quantity of image pairs in the plurality of image sets as a target image set; and finally, when a lowest similarity of all image pairs in the target image set is greater than a similarity threshold, determining a rotational symmetry degree of freedom corresponding to the target image set as the rotational symmetry degree of freedom of the target object.

It should be noted that each rotational symmetry degree of freedom corresponds to at least one image pair. To be specific, for any one of the plurality of rotational symmetry degrees of freedom, the plurality of 2D images can be sampled based on the rotational symmetry degree of freedom, to obtain at least one image pair corresponding to the rotational symmetry degree of freedom. Optionally, each of the image pairs includes two 2D images. When the rotational symmetry degree of freedom is N, first rendering angles of the two 2D images included in the image pair differ by 360/N degrees.

In addition, a difference between a highest similarity of all image pairs in an image set and a lowest similarity of all the image pairs in the image set is less than or equal to a preset value, and all the image pairs in the image set have a same rotational symmetry degree of freedom. In other words, similarities of all the image pairs in the image set fall within a similarity interval, and an interval length of the similarity interval is the preset value.

In addition, when the preset value is 0, it indicates that all the image pairs in the image set have a same similarity. In this case, for any one of the plurality of image sets, all image pairs in the image set have a same similarity. In other words, the image set corresponds to one similarity and one rotational symmetry degree of freedom.

In this embodiment of this application, because the target image set is an image set that includes the largest quantity of image pairs in the plurality of image sets, the image pairs included in the target image set can better reflect symmetry of the target object. Therefore, the symmetry of the target object may be determined based on the target image set. When a lowest similarity of all the image pairs in the target image set is greater than the similarity threshold, it indicates that similarities of all of the image pairs in the target image set are high. It also indicates that, after rotating by a rotation angle indicated by the rotational symmetry degree of freedom corresponding to the target image set, the target object probably coincides with the target object before the rotation. Therefore, it can be determined that the target object has rotational symmetry, and the rotational symmetry degree of freedom corresponding to the target image set can be determined as the rotational symmetry degree of freedom of the target object.

When the second rendering angles of the plurality of 2D images are the same, the operation of determining the rotational symmetry degree of freedom corresponding to the target image set as the rotational symmetry degree of freedom of the target object may be as follows: obtaining 2D images at a plurality of different second rendering angles of the 3D model through rendering; sampling the 2D images at the plurality of different second rendering angles based on the rotational symmetry degree of freedom corresponding to the target image set, to obtain image pairs at the plurality of different second rendering angles; and when similarities of the image pairs at the plurality of different second rendering angles are all greater than the similarity threshold, determining that the target object has rotational symmetry, and determining the rotational symmetry degree of freedom corresponding to the target image set as the rotational symmetry degree of freedom of the target object.

In this embodiment of this application, the target object may be checked from a plurality of perspectives. In other words, the 2D images may be re-obtained at a plurality of different second rendering angles to check symmetry of the target object based on the 2D images at the plurality of different second rendering angles. After the checking performed from the plurality of perspectives succeeds, it can be determined that the target object has rotational symmetry, and the rotational symmetry degree of freedom corresponding to the target image set can be determined as the rotational symmetry degree of freedom of the target object. This can improve accuracy of determining whether the object has symmetry.

The operation of obtaining a plurality of two-dimensional 2D images of the target object through rendering based on the 3D model may be as follows: determining a plurality of first coordinate points from a coordinate system, where a first included angle of each of the first coordinate points is 0 degrees, and a second included angle of each of the first coordinate points is greater than 0 degrees and less than or equal to a preset angle; then, obtaining first reference images by rendering the 3D model by using all the plurality of first coordinate points as observation positions, and determining, as a second rendering angle, a second included angle of a first coordinate point corresponding to a first reference image with a largest area in the plurality of obtained first reference images; and finally, obtaining 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the determined second rendering angle.

It should be noted that the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, and the target plane is a plane on which the second coordinate axis and a third coordinate axis are located.

In addition, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis.

In this embodiment of this application, for the first coordinate point corresponding to the first reference image with the largest area in the plurality of obtained first reference images, it can be learned that a 2D image that is obtained through rendering by using the second included angle of the first coordinate point as a main observational angle has a largest area, because the first included angle of the first coordinate point is 0 degrees. Therefore, in this case, a second coordinate point whose second included angle is a second included angle of the first coordinate point and whose first included angle is any angle within [0, 306] (unit: degree) in the coordinate system may be used as an observation position, so that a 2D image with complete and comprehensive shape and texture information can be obtained subsequently based on the observation position.

The operation of obtaining pose information of the target object may be as follows: inputting image data obtained by photographing the target object into a pose detection classifier, and analyzing the image data by using the pose detection classifier to obtain the pose information of the target object, where the pose detection classifier is obtained by training images of the target object based on the rotational symmetry degree of freedom of the target object.

In a possible implementation, before the adjusting the pose information of the target object based on the rotational symmetry degree of freedom to obtain adjusted pose information, the method further includes: determining whether the pose information of the target object needs to be adjusted. The adjusting the pose information of the target object based on the rotational symmetry degree of freedom to obtain adjusted pose information specifically includes: when the pose information of the target object needs to be adjusted, adjusting the pose information of the target object based on the rotational symmetry degree of freedom to obtain the adjusted pose information.

In a possible implementation, the determining whether the pose information of the target object needs to be adjusted specifically includes: determining, based on the rotational symmetry degree of freedom of the target object and a yaw angle in the pose information of the target object, whether the pose information of the target object needs to be adjusted.

In a possible implementation, the determining whether the pose information of the target object needs to be adjusted specifically includes: when the rotational symmetry degree of freedom of the target object is 0 degrees and the yaw angle is 0 degrees, determining that the pose information of the target object does not need to be adjusted; or when the rotational symmetry degree of freedom of the target object is not 0 degrees and the yaw angle satisfies $$yaw_1 \in \left[0, \frac{360}{N}\right),$$

determining that the pose information of the target object does not need to be adjusted, where $yaw_1$ represents the yaw angle in the pose information of the target object, and N represents the rotational symmetry degree of freedom of the target object.

In a possible implementation, when the target object does not have rotational symmetry degree of freedom, the virtual object is displayed based on the pose information of the target object. Alternatively, when the pose information of the target object does not need to be adjusted, the virtual object is displayed based on the pose information of the target object.

It should be noted that, after the image data is input into the pose detection classifier, the pose detection classifier may output the identifier of the target object and position information of projection points corresponding to the center point and vertexes of the target object that are included in the image data; or the pose detection classifier may output the identifier of the target object and the pose information of the target object that are included in the image data.

In addition, when the image data is analyzed by using the pose detection classifier to obtain the pose information of the target object, if the pose detection classifier outputs the identifier of the target object and the position information of the projection points corresponding to the center point and the vertexes of the target object that are included in the image data, a 3D model corresponding to the identifier of the target object may be obtained. The pose information of the target object is determined based on the 3D model and the position information.

The pose information includes six-degree-of-freedom (DoF) pose information (x,y,z,yaw, pitch,roll), where x represents front-to-back displacement, y represents left-to-right displacement, z represents up-to-down displacement, yaw represents a yaw angle, pitch represents a pitch angle, and roll represents a roll angle. The operation of adjusting the pose information of the target object based on the rotational symmetry degree of freedom to obtain adjusted pose information may be as follows: determining pose information other than the yaw angle in the pose information of the target object as the adjusted pose information, where the yaw angle is an angle at which the target object rotates around a rotational axis; and when the rotational symmetry degree of freedom of the target object is 0 degrees, determining that a yaw angle in the adjusted pose information is 0 degrees; or when the rotational symmetry degree of freedom of the target object is not 0 degrees, determining a yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N} * t, \frac{360}{N} * (t+1)\right), t = \lfloor yaw_1 * N / 360 \rfloor \end{cases},$$

where
$yaw_2$ represents the yaw angle in the adjusted pose information, $yaw_1$ represents the yaw angle in the pose information of the target object, and N represents the rotational symmetry degree of freedom of the target object.

In this case, the pose information of the target object is (x,y,z,$yaw_1$, pitch,roll), and the pose information of the virtual object is (x,y,z,$yaw_2$, pitch,roll). In addition, when the rotational symmetry degree of freedom of the target object is 0 degrees, $yaw_2$ is 0 degrees; or when the rotational symmetry degree of freedom of the target object is not 0 degrees, $yaw_2$ is determined according to the foregoing formula.

According to a second aspect, a method for determining symmetry of an object is provided. According to this method, after a 3D model of a target object is obtained, a plurality of 2D images of the target object are obtained through rendering based on the 3D model. Then, a rotational symmetry degree of freedom of the target object is obtained by performing similarity calculation and clustering analysis on the plurality of 2D images.

It should be noted that the plurality of 2D images may be 2D views obtained by rendering the 3D model at different perspectives. Rendering perspectives of the plurality of 2D images may be different. A rendering perspective of each of the 2D images may include a first rendering angle and a second rendering angle. In a possible case, first rendering angles of the plurality of 2D images are different, and second rendering angles of the plurality of 2D images are the same.

In addition, the rotational symmetry degree of freedom may be represented by N, where N is a natural number. The rotational symmetry degree of freedom equal to N indicates that an object that rotates by 360/N degrees around a rotational axis can completely coincide with the object before the rotation. The rotational symmetry degree of freedom equal to 0 indicates that the object that rotates by any angle around the rotational axis can completely coincide with the object before the rotation.

In this embodiment of this application, whether the target object has rotational symmetry can be accurately identified, and the rotational symmetry degree of freedom of the target object can be obtained when the target object has rotational symmetry. This helps reduce difficulties in pose recognition for an object during pose detection and tracking, and improve accuracy of pose recognition for the object.

The operation of obtaining a rotational symmetry degree of freedom of the target object by performing similarity calculation and clustering analysis on the plurality of 2D images may be as follows: sampling the plurality of 2D images based on a plurality of rotational symmetry degrees of freedom, to obtain a plurality of image pairs; then, calculating similarities of all the plurality of image pairs first, and then performing clustering analysis on the plurality of image pairs based on the similarities and the rotational symmetry degrees of freedom, to obtain a plurality of image sets; determining an image set having a largest quantity of image pairs in the plurality of image sets as a target image set; and finally, when a lowest similarity of all image pairs in the target image set is greater than a similarity threshold, determining a rotational symmetry degree of freedom corresponding to the target image set as the rotational symmetry degree of freedom of the target object.

It should be noted that each rotational symmetry degree of freedom corresponds to at least one image pair. To be specific, for any one of the plurality of rotational symmetry degrees of freedom, the plurality of 2D images can be sampled based on the rotational symmetry degree of freedom, to obtain at least one image pair corresponding to the rotational symmetry degree of freedom. Optionally, each of the image pairs includes two 2D images. When the rotational symmetry degree of freedom is N, first rendering angles of the two 2D images included in the image pair differ by 360/N degrees.

In addition, a difference between a highest similarity of all image pairs in an image set and a lowest similarity of all the image pairs in the image set is less than or equal to a preset value, and all the image pairs in the image set have a same rotational symmetry degree of freedom. In other words, similarities of all the image pairs in the image set fall within a similarity interval, and an interval length of the similarity interval is the preset value.

In addition, when the preset value is 0, it indicates that all the image pairs in the image set have a same similarity. In this case, for any one of the plurality of image sets, all image pairs in the image set have a same similarity. In other words, the image set corresponds to one similarity and one rotational symmetry degree of freedom.

In this embodiment of this application, because the target image set is an image set that includes the largest quantity of image pairs in the plurality of image sets, the image pairs included in the target image set can better reflect symmetry of the target object. Therefore, the symmetry of the target object may be determined based on the target image set. When a lowest similarity of all the image pairs in the target image set is greater than the similarity threshold, it indicates that similarities of all of the image pairs in the target image set are high. It also indicates that, after rotating by a rotation angle indicated by the rotational symmetry degree of freedom corresponding to the target image set, the target object probably coincides with the target object before the rotation. Therefore, it can be determined that the target object has rotational symmetry, and the rotational symmetry degree of freedom corresponding to the target image set can be determined as the rotational symmetry degree of freedom of the target object.

When second rendering perspectives of the plurality of 2D images are the same, the operation of determining the rotational symmetry degree of freedom corresponding to the target image set as the rotational symmetry degree of freedom of the target object may be as follows: obtaining 2D images at a plurality of different second rendering angles of the 3D model through rendering; sampling the 2D images at the plurality of different second rendering angles based on the rotational symmetry degree of freedom corresponding to the target image set, to obtain image pairs at the different second rendering angles; and when similarities of the image pairs at the plurality of different second rendering angles are all greater than the similarity threshold, determining that the target object has rotational symmetry, and determining the rotational symmetry degree of freedom corresponding to the target image set as the rotational symmetry degree of freedom of the target object.

In this embodiment of this application, the target object may be checked from a plurality of perspectives. In other words, the 2D images may be re-obtained at a plurality of different second rendering angles to check symmetry of the target object based on the 2D images at the plurality of different second rendering angles. After the checking performed from the plurality of perspectives succeeds, it can be determined that the target object has rotational symmetry, and the rotational symmetry degree of freedom corresponding to the target image set can be determined as the rotational symmetry degree of freedom of the target object. This can improve accuracy of determining whether the object has symmetry.

The operation of obtaining a plurality of two-dimensional 2D images of the target object through rendering based on the 3D model may be as follows: determining a plurality of first coordinate points from a coordinate system, where a first included angle of each of the first coordinate points is 0 degrees, and a second included angle of each of the first coordinate points is greater than 0 degrees and less than or equal to a preset angle; then, obtaining first reference images by rendering the 3D model by using all the plurality of first coordinate points as observation positions, and determining, as a second rendering angle, a second included angle of a first coordinate point corresponding to a first reference image with a largest area in the plurality of obtained first reference images; and finally, obtaining 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the determined second rendering angle.

It should be noted that the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, and the target plane is a plane on which the second coordinate axis and a third coordinate axis are located.

In addition, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis.

In this embodiment of this application, for the first coordinate point corresponding to the first reference image with the largest area in the plurality of obtained first reference images, it can be learned that a 2D image that is obtained through rendering by using the second included angle of the first coordinate point as a main observational angle has a largest area, because the first included angle of the first coordinate point is 0 degrees. Therefore, in this case, a second coordinate point whose second included angle is a second included angle of the first coordinate point and whose first included angle is any angle within [0, 306] (unit: degree) in the coordinate system may be used as an observation position, so that a 2D image with complete and comprehensive shape and texture information can be obtained subsequently based on the observation position.

Further, pose information of the target object may be obtained after the rotational symmetry degree of freedom of the target object is obtained. Then, the pose information of the target object is adjusted based on the rotational symmetry degree of freedom to obtain adjusted pose information, where the adjusted pose information is used for displaying a virtual object, and the virtual object is an object associated with the target object. Then, the virtual object may be further displayed based on the adjusted pose information.

In this embodiment of this application, pose information of the virtual object can be adaptively adjusted based on the rotational symmetry degree of freedom of the target object, so that a virtual-real fusion display result may be displayed at an optimal display angle relative to a camera. This improves viewing experience of users.

The operation of obtaining pose information of the target object may be as follows: inputting image data obtained by photographing the target object into a pose detection classifier, and analyzing the image data by using the pose detection classifier to obtain the pose information of the target object, where the pose detection classifier is obtained by training images of the target object based on the rotational symmetry degree of freedom.

In a possible implementation, before the adjusting the pose information of the target object based on the rotational symmetry degree of freedom to obtain adjusted pose information, the method further includes: determining whether the pose information of the target object needs to be adjusted. The adjusting the pose information of the target object based on the rotational symmetry degree of freedom to obtain adjusted pose information specifically includes: when the pose information of the target object needs to be adjusted, adjusting the pose information of the target object based on the rotational symmetry degree of freedom to obtain the adjusted pose information.

In a possible implementation, the determining whether the pose information of the target object needs to be adjusted specifically includes: when the rotational symmetry degree of freedom of the target object is 0 degrees but the yaw angle is not 0 degrees, determining that the pose information of the target object needs to be adjusted; or when the rotational symmetry degree of freedom of the target object is not 0 degrees and the yaw angle is not within [0, 360/N), determining that the pose information of the target object needs to be adjusted, where N represents the rotational symmetry degree of freedom of the target object. It should be noted that, after the image data is input into the pose detection classifier, the pose detection classifier may output an identifier of the target object and position information of projection points corresponding to the center point and vertexes of the target object that are included in the image data; or the pose detection classifier may output an identifier of the target object and the pose information of the target object that are included in the image data.

In addition, when the image data is analyzed by using the pose detection classifier to obtain the pose information of the target object, if the pose detection classifier outputs the identifier of the target object and the position information of the projection points corresponding to the center point and the vertexes of the target object that are included in the image data, a 3D model corresponding to the identifier of the target object may be obtained. The pose information of the target object is determined based on the 3D model and the position information.

Further, after the rotational symmetry degree of freedom of the target object is obtained, a plurality of images of the target object and pose information of the target object in each of the images may be further obtained, and then images whose yaw angles in the pose information are greater than 0 degrees and less than a rotation angle are selected from the plurality of images as training images. The rotation angle is a ratio of 360 to the rotational symmetry degree of freedom of the target object. Then, a to-be-trained detection model is trained by using the plurality of selected training images as input samples and by using pose information of the target object in each of the plurality of training images and the identifier of the target object as sample labels, to obtain the pose detection classifier.

In this embodiment of this application, because an image whose yaw angle is greater than the rotation angle in the plurality of images is the same as an image whose yaw angle is greater than 0 degrees and less than the rotation angle in the plurality of images, the image whose yaw angle is greater than the rotation angle in the plurality of images may be filtered out, and only the image whose yaw angle is greater than 0 degrees and less than the rotation angle is selected as a training image to train the to-be-trained detection model. This can improve performance of the pose detection classifier obtained through training.

The pose information includes 6-DoF pose information (x,y,z,yaw, pitch,roll), where x represents front-to-back displacement, y represents left-to-right displacement, z represents up-to-down displacement, yaw represents a yaw angle, pitch represents a pitch angle, and roll represents a roll angle. The operation of adjusting the pose information of the target object based on the rotational symmetry degree of freedom to obtain adjusted pose information may be as follows: determining pose information other than the yaw angle in the pose information of the target object as the adjusted pose information, where the yaw angle is an angle at which the target object rotates around a rotational axis; and when the rotational symmetry degree of freedom of the target object is 0 degrees, determining that a yaw angle in the adjusted pose information is 0 degrees; or when the rotational symmetry degree of freedom of the target object is not 0 degrees, determining a yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N} * t, \frac{360}{N} * (t+1)\right), t = \lfloor yaw_1 * N / 360 \rfloor \end{cases},$$

where yaw$_2$ represents the yaw angle in the adjusted pose information, yaw$_1$ represents the yaw angle in the pose information of the target object, and N represents the rotational symmetry degree of freedom of the target object.

In this case, the pose information of the target object is (x,y,z,yaw$_1$, pitch,roll), and the pose information of the virtual object is (x,y,z,yaw$_2$, pitch,roll). In addition, when the rotational symmetry degree of freedom of the target object is 0 degrees, yaw$_2$ is 0 degrees; or when the rotational symmetry degree of freedom of the target object is not 0 degrees, yaw$_2$ is determined according to the foregoing formula.

According to a third aspect, an apparatus for obtaining pose information is provided. The apparatus includes a first obtaining module, a second obtaining module, and an adjustment module. The first obtaining module is configured to obtain a rotational symmetry degree of freedom of a target object. The second obtaining module is configured to obtain pose information of the target object. The adjustment module is configured to adjust the pose information of the target object based on the rotational symmetry degree of freedom to obtain adjusted pose information, where the adjusted pose information is used for displaying a virtual object, and the virtual object is an object associated with the target object.

Optionally, the first obtaining module is specifically configured to: obtain an identifier of the target object, and use a rotational symmetry degree of freedom corresponding to the identifier of the target object as the rotational symmetry degree of freedom of the target object.

Optionally, the first obtaining module is specifically configured to obtain a rotational symmetry degree of freedom of the target object input by a user.

Optionally, the first obtaining module is specifically configured to: obtain an identifier of the target object; obtain a 3D model corresponding to the identifier of the target object; obtain a plurality of 2D images of the target object through rendering based on the 3D model; and obtain the rotational symmetry degree of freedom of the target object by performing similarity calculation and clustering analysis on the plurality of 2D images.

Optionally, the first obtaining module is specifically configured to: sample the plurality of 2D images based on a plurality of rotational symmetry degrees of freedom, to obtain a plurality of image pairs, where each of the rotational symmetry degrees of freedom corresponds to at least one image pair; calculate similarities of all the plurality of image pairs; perform clustering analysis on the plurality of image pairs based on the similarities and the rotational symmetry degrees of freedom, to obtain a plurality of image sets, where a difference between a highest similarity of all image pairs in an image set and a lowest similarity of all the image pairs in the image set is less than or equal to a preset value, and all the image pairs in the image set have a same rotational symmetry degree of freedom; determine an image set having a largest quantity of image pairs in the plurality of image sets as a target image set; and when a lowest similarity of all image pairs in the target image set is greater than a similarity threshold, determine a rotational symmetry degree of freedom corresponding to the target image set as the rotational symmetry degree of freedom of the target object.

Optionally, each of the image pairs includes two 2D images. When the rotational symmetry degree of freedom is N, first rendering angles of the two 2D images included in the image pair differ by 360/N degrees.

Optionally, second rendering angles of the plurality of 2D images are the same. The first obtaining module is specifically configured to: obtain 2D images at a plurality of different second rendering angles of the 3D model through rendering; sample the 2D images at the plurality of different second rendering angles based on the rotational symmetry degree of freedom corresponding to the target image set, to obtain image pairs at the plurality of different second rendering angles; and when similarities of the image pairs at the plurality of different second rendering angles are all greater than the similarity threshold, determine that the target object has rotational symmetry, and determine the rotational symmetry degree of freedom corresponding to the target image set as the rotational symmetry degree of freedom of the target object.

Optionally, the second obtaining module is specifically configured to: input image data obtained by photographing the target object into a pose detection classifier, and analyze the image data by using the pose detection classifier to obtain the pose information of the target object, where the pose detection classifier is obtained by training images of the target object based on the rotational symmetry degree of freedom.

Optionally, the pose information includes 6-DoF pose information (x,y,z,yaw, pitch,roll) where x represents front-to-back displacement, y represents left-to-right displacement, z represents up-to-down displacement, yaw represents a yaw angle, pitch represents a pitch angle, and roll represents a roll angle. The adjustment module is specifically configured to determine pose information other than the yaw angle in the pose information of the target object as the adjusted pose information, where the yaw angle is an angle at which the target object rotates around a rotational axis; and when the rotational symmetry degree of freedom of the target object is 0 degrees, determine that a yaw angle in the adjusted pose information is 0 degrees; or when the rotational symmetry degree of freedom of the target object is not 0 degrees, determine a yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N} * t, \frac{360}{N} * (t+1)\right), t = \lfloor yaw_1 * N / 360 \rfloor \end{cases},$$

where yaw$_2$ represents the yaw angle in the adjusted pose information, yaw$_1$ represents the yaw angle in the pose information of the target object, and N represents the rotational symmetry degree of freedom of the target object.

Optionally, the apparatus further includes: a display module, configured to display the virtual object based on the adjusted pose information.

Optionally, the first obtaining module is specifically configured to: determine a plurality of first coordinate points from a coordinate system, where a first included angle of each of the first coordinate points is 0 degrees, a second included angle of each of the first coordinate points is greater than 0 degrees and less than or equal to a preset angle, the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, the target plane is a plane on which the second coordinate axis and a third coordinate axis are located, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis; obtain first reference images by rendering the 3D model by using all the plurality of first coordinate points as observation positions; determine, as a second rendering angle, a second included angle of a first coordinate point corresponding to a first reference image with a largest area in the plurality of obtained first reference images; and obtain 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the second rendering angle.

According to a fourth aspect, an apparatus for obtaining pose information is provided. The apparatus for obtaining pose information includes a processor and a communications interface. The processor receives or sends information through the communications interface, and the processor is configured to invoke program instructions stored in a memory, to implement the steps of the method for obtaining pose information provided in the first aspect.

For example, the information includes data information or analog information, and the data information includes image data information, video data information, or audio data information.

In a possible implementation, the apparatus further includes the memory and a communications bus. The processor, the memory, and the communications interface are all coupled to the communications bus.

According to a fifth aspect, a computer-readable storage medium is provided. The computer-readable storage medium stores instructions, and when the instructions are run on a computer or a processor, the computer or the processor is enabled to perform the method for obtaining pose information according to the first aspect.

According to a sixth aspect, a computer program product including instructions is provided. When the computer program product runs on a computer or a processor, the computer or the processor is enabled to perform the method for obtaining pose information according to the first aspect.

Technical effects achieved in the third aspect, the fourth aspect, the fifth aspect, and the sixth aspect are similar to technical effects achieved by using corresponding technical means in the first aspect. Details are not described herein again.

According to a seventh aspect, an apparatus for determining symmetry of an object is provided. The apparatus includes a first obtaining module, a rendering module, and an analysis module.

The first obtaining module is configured to obtain a 3D model of a target object.

The rendering module is configured to obtain a plurality of two-dimensional (2D) images of the target object through rendering based on the 3D model.

The analysis module is configured to obtain a rotational symmetry degree of freedom of the target object by performing similarity calculation and clustering analysis on the plurality of 2D images.

Optionally, the analysis module is specifically configured to:

sample the plurality of 2D images based on a plurality of rotational symmetry degrees of freedom, to obtain a plurality of image pairs, where each of the rotational symmetry degrees of freedom corresponds to at least one image pair;

calculate similarities of all the plurality of image pairs;

perform clustering analysis on the plurality of image pairs based on the similarities and the rotational symmetry degrees of freedom, to obtain a plurality of image sets, where a difference between a highest similarity of all image pairs in an image set and a lowest similarity of all the image pairs in the image set is less than or equal to a preset value, and all the image pairs in the image set have a same rotational symmetry degree of freedom;

determine an image set having a largest quantity of image pairs in the plurality of image sets as a target image set; and when a lowest similarity of all image pairs in the target image set is greater than a similarity threshold, determine a rotational symmetry degree of freedom corresponding to the target image set as the rotational symmetry degree of freedom of the target object.

Optionally, each of the image pairs includes two 2D images. When the rotational symmetry degree of freedom is N, first rendering angles of the two 2D images included in the image pair differ by 360/N degrees.

Optionally, second rendering perspectives of the plurality of 2D images are the same, and the analysis module is specifically configured to:

obtain 2D images at a plurality of different second rendering angles of the 3D model through rendering;

sample the 2D images at the plurality of different second rendering angles based on the rotational symmetry degree of freedom corresponding to the target image set, to obtain image pairs at the plurality of different second rendering angles; and when similarities of the image pairs at the plurality of different second rendering angles are all greater than the similarity threshold, determine that the target object has rotational symmetry, and determine the rotational symmetry degree of freedom corresponding to the target image set as the rotational symmetry degree of freedom of the target object.

Optionally, the rendering module is specifically configured to:

determine a plurality of first coordinate points from a coordinate system, where a first included angle of each of the first coordinate points is 0 degrees, a second included angle of each of the first coordinate points is greater than 0 degrees and less than or equal to a preset angle, the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, the target plane is a plane on which the second coordinate axis and a third coordinate axis are located, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis;

obtain first reference images by rendering the 3D model by using all the plurality of first coordinate points as observation positions;

determine, as a second rendering angle, a second included angle of a first coordinate point corresponding to a first reference image with a largest area in the plurality of obtained first reference images; and obtain 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the second rendering angle.

Optionally, the apparatus further includes:

a second obtaining module, configured to obtain pose information of the target object; and an adjustment module, configured to adjust the pose information of the target object based on the rotational symmetry degree of freedom to obtain adjusted pose information, where the adjusted pose information is used for displaying a virtual object, and the virtual object is an object associated with the target object.

Optionally, the second obtaining module is specifically configured to:

input image data obtained by photographing the target object into a pose detection classifier; and analyze the image data by using the pose detection classifier to obtain the pose information of the target object, where the pose detection classifier is obtained by training images of the target object based on the rotational symmetry degree of freedom.

Optionally, the apparatus further includes:

a third obtaining module, configured to obtain a plurality of images of the target object and pose information of the target object in each of the images;

a selection module, configured to select, from the plurality of images, images whose yaw angles in pose information are greater than 0 degrees and less than a rotation angle as training images, where the rotation angle is a ratio of 360 degrees to the rotational symmetry degree of freedom of the target object; and a training module, configured to train a to-be-trained detection model by using the plurality of selected training images as input samples and by using pose information of the target object in each of the plurality of training images and an identifier of the target object as sample labels, to obtain the pose detection classifier.

Optionally, the pose information includes 6-DoF pose information (x,y,z,yaw, pitch,roll), where x represents front-to-back displacement, y represents left-to-right displacement, z represents up-to-down displacement, yaw represents a yaw angle, pitch represents a pitch angle, and roll represents a roll angle.

The adjustment module is specifically configured to:

determine pose information other than the yaw angle in the pose information of the target object as the adjusted pose information, where the yaw angle is an angle at which the target object rotates around a rotational axis; and when the rotational symmetry degree of freedom of the target object is 0 degrees, determine that a yaw angle in the adjusted pose information is 0 degrees; or when the rotational symmetry degree of freedom of the target object is not 0 degrees, determine a yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N}*t, \frac{360}{N}*(t+1)\right), t = \lfloor yaw_1 * N/360 \rfloor \end{cases},$$

where $yaw_2$ represents the yaw angle in the adjusted pose information, $yaw_1$ represents the yaw angle in the pose information of the target object, and N represents the rotational symmetry degree of freedom of the target object.

Optionally, the apparatus further includes:

a display module, configured to display the virtual object based on the adjusted pose information.

According to an eighth aspect, an apparatus for determining symmetry of an object is provided. The apparatus includes a processor and a communications interface. The processor receives or sends information through the communications interface, and the processor is configured to invoke program instructions stored in a memory, to implement the steps of the method for determining symmetry of an object according to the second aspect.

For example, the information includes data information or analog information, and the data information includes image data information, video data information, or audio data information.

In a possible implementation, the apparatus further includes the memory and a communications bus. The processor, the memory, and the communications interface are all coupled to the communications bus.

According to a ninth aspect, a computer-readable storage medium is provided. The computer-readable storage medium stores instructions, and when the instructions are run on a computer or a processor, the computer or the processor is enabled to perform the method for determining symmetry of an object according to the second aspect.

According to a tenth aspect, a computer program product including instructions is provided. When the computer program product runs on a computer or a processor, the computer or the processor is enabled to perform the method for determining symmetry of an object according to the second aspect.

Technical effects achieved in the seventh aspect, the eighth aspect, the ninth aspect, and the tenth aspect are similar to technical effects achieved by using corresponding technical means in the second aspect. Details are not described herein again.

DESCRIPTION OF EMBODIMENTS

In the specification, claims, and accompanying drawings of this application, the terms "first", "second", and the like are intended to distinguish between similar objects but do not necessarily indicate a specific order or sequence. Moreover, the terms "include", "have", and any other variants thereof are intended to cover a non-exclusive inclusion, for example, including a series of steps or units. A method, system, product, or device does not need to be limited to those explicitly listed steps or units, but may include other steps or units that are not explicitly listed or that are inherent to the process, method, product, or device.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between associated objects. "At least one of the following" or a similar expression thereof indicates any combination of the following, including a single item or any combination of a plurality of items. For example, at least one (piece) of a, b, or c may represent: a, b, c, "a and b", "a and c", "b and c", or "a, b, and c", where a, b, and c may be singular or plural.

To make the objectives, technical solutions, and advantages of this application clearer, the following further describes the implementations of this application in detail with reference to the accompanying drawings.

Before the embodiments of this application are described in detail, application scenarios of the embodiments of this application are described first.

This application may be applied to the field of environment understanding such as autonomous driving and augmented reality. For example, when users are in shopping malls, visiting museums or exhibition halls, it is important to intuitively and vividly present interpretations of goods, exhibits, and the like to the users. According to this application, poses of objects can be recognized, and corresponding interpretations are accurately superimposed at different positions of the objects in three-dimensional space based on the poses of the objects. In this way, users can see, by using terminals, an optimal virtual-real fusion effect, namely, an effect of fusion of the interpretations and the real object.

The following describes a system architecture used in the embodiments of this application.

Figure 1:
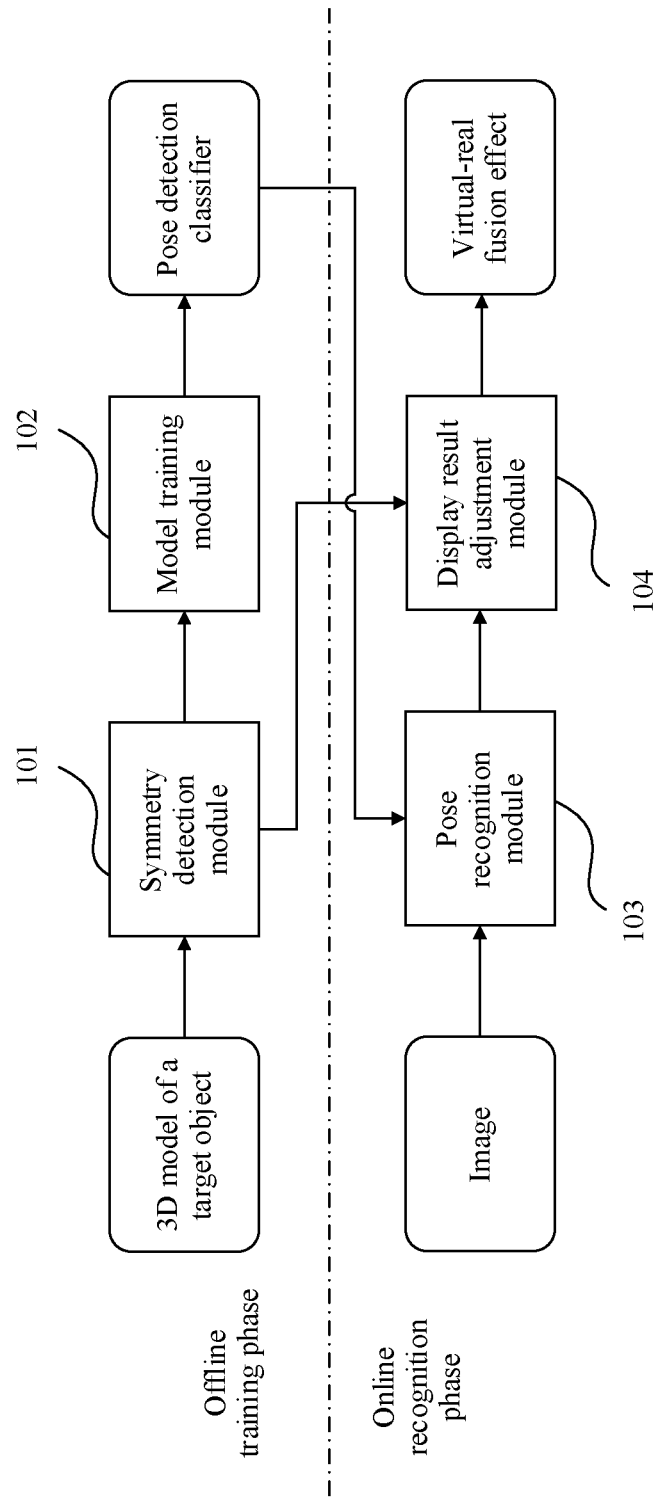
FIG. 1 is a schematic diagram of a pose recognition system according to an embodiment of this application.

FIG. 1 is a schematic diagram of a pose recognition system according to an embodiment of this application. Refer to FIG. 1. The system may include a symmetry detection module 101, a model training module 102, a pose recognition module 103, and a display result adjustment module 104.

Specifically, the symmetry detection module 101 may detect, based on a 3D model of a target object, whether the target object has rotational symmetry, and obtain a rotational symmetry degree of freedom of the target object when the target object has rotational symmetry. The model training module 102 may select at least some images from a plurality of images of the target object as training images based on the rotational symmetry degree of freedom of the target object, and then train a to-be-trained detection model by using the selected plurality of training images, to obtain a pose detection classifier. In an optional case, the symmetry detection module 101 detects, in an offline training phase, whether the target object has rotational symmetry; the symmetry detection module 101 obtains or obtains in advance the rotational symmetry degree of freedom of the target object in the offline training phase; and the pose detection classifier is also obtained through training or obtained in advance through training in the offline training phase. In an optional case, the symmetry detection module 101 and the model training module 102 are located in a server.

The pose recognition module 103 may perform pose recognition on an input image, to obtain pose information of the target object in the image. For example, the input image is an image obtained by photographing the target object by a user. The image may be a color (Red Green Blue, RGB) image or a color depth (Red Green Blue Depth, RGBD) image. The pose recognition module 103 may be the pose detection classifier obtained through training in the offline training phase, and the pose detection classifier may be a neural network model or a deep learning model. The display result adjustment module 104 may determine pose information of a virtual object based on the rotational symmetry degree of freedom of the target object and the pose information of the target object, and display the virtual object in the image based on the pose information of the virtual object, to achieve a virtual-real fusion effect. In an optional case, the pose recognition module 103 and the display result adjustment module 104 are located on a terminal side, and are configured to: obtain, based on a user requirement, the pose information of the virtual object associated with the target object; and display, based on the pose information, the virtual object in three-dimensional space in which the target object is located.

For example, in a museum scenario, a server performs symmetry detection on each object in a to-be-exhibited object library of the museum in an offline training phase, to obtain a symmetry detection result. The symmetry detection result includes a correspondence between an identifier of an object and a rotational symmetry degree of freedom. In other words, the symmetry detection result records an identifier of each object, whether each object has rotational symmetry, and records a rotational symmetry degree of freedom of an object having rotational symmetry. The following Table 1 lists example symmetry detection results. The symmetry detection result includes an object identifier, rotational symmetry, and a rotational symmetry degree of freedom. The object identifier is used to identify an object. Rotational symmetry corresponding to each object identifier is used to indicate whether an object identified by the object identifier has rotational symmetry, and whether the object has rotational symmetry may be indicated by an indication value. For example, when an indication value of the rotational symmetry corresponding to the object identifier is 0, it indicates that the object does not have rotational symmetry; when an indication value of the rotational symmetry corresponding to the object identifier is 1, it indicates that the object has rotational symmetry. A rotational symmetry degree of freedom corresponding to each object identifier is a rotational symmetry degree of freedom of the object when the object identified by the object identifier has rotational symmetry.

TABLE 1

| Object identifier | Rotational symmetry | Rotational symmetry degree of freedom |
|---|---|---|
| 1 | Symmetric | N1 |
| 2 | Asymmetric | |
| 3 | Symmetric | N2 |
| 4 | Symmetric | N3 |

It should be noted that in this embodiment of this application, Table 1 is merely used as an example to describe the symmetry detection result. Table 1 does not constitute any limitation on this embodiment of this application.

In addition, the symmetry detection result may be stored in a memory of the server; or may be sent to a terminal, and stored in a memory of the terminal.

Further, the server may obtain the pose detection classifier through training based on the symmetry detection result, and the pose detection classifier may be configured to output an identifier and pose information of a three-dimensional object. In an optional case, the pose detection classifier obtained through training by the server is integrated into the terminal. When visiting a museum, a user may obtain, by using the terminal, an image of any interested object in the museum in real time, and the terminal may input the image into the pose detection classifier, to obtain an identifier and pose information of the object. In an optional case, the terminal obtains, from the server based on the obtained object identifier, a rotational symmetry degree of freedom corresponding to the object identifier; or obtains, from a local memory based on the object identifier, a rotational symmetry degree of freedom corresponding to the object identifier. Further, the terminal adjusts, based on the obtained rotational symmetry degree of freedom, the pose information obtained by using the pose detection classifier, to obtain adjusted pose information; and displays, based on the adjusted pose information, a virtual object associated with the object. For example, the virtual object is a brief introduction of the object.

In an optional solution, after the rotational symmetry degree of freedom of the target object and the pose information of the target object are obtained, it is determined whether the pose information of the target object needs to be adjusted. When it is determined that the pose information of the target object needs to be adjusted, the pose information of the target object is adjusted based on the rotational symmetry degree of freedom, to obtain the adjusted pose information. For example, whether the pose information of the target object needs to be adjusted may be determined based on the rotational symmetry degree of freedom of the target object and a yaw angle in the pose information of the target object.

Specifically, when the rotational symmetry degree of freedom of the target object is 0 degrees, and the yaw angle in the pose information of the target object is 0 degrees, it is determined that the pose information does not need to be adjusted.

When the rotational symmetry degree of freedom of the target object is not 0 degrees and the yaw angle in the pose information of the target object satisfies $$yaw_1 \in \left[0, \frac{360}{N}\right),$$

it is determined that the pose information of the target object does not need to be adjusted, where $yaw_1$ represents the yaw angle in the pose information of the target object, and N represents the rotational symmetry degree of freedom of the target object. When the rotational symmetry degree of freedom of the target object is 0 degrees but the yaw angle is not 0 degrees, the pose information of the target object needs to be adjusted. Alternatively, when the rotational symmetry degree of freedom of the target object is not 0 degrees and the yaw angle is not within [0, 360/N), the pose information of the target object needs to be adjusted, where N is the rotational symmetry degree of freedom of the target object.

In an optional solution, when the target object does not have rotational symmetry degree of freedom, the virtual object is displayed based on the pose information of the target object. Alternatively, when the pose information of the target object does not need to be adjusted, the virtual object is displayed based on the pose information of the target object.

Figure 2:
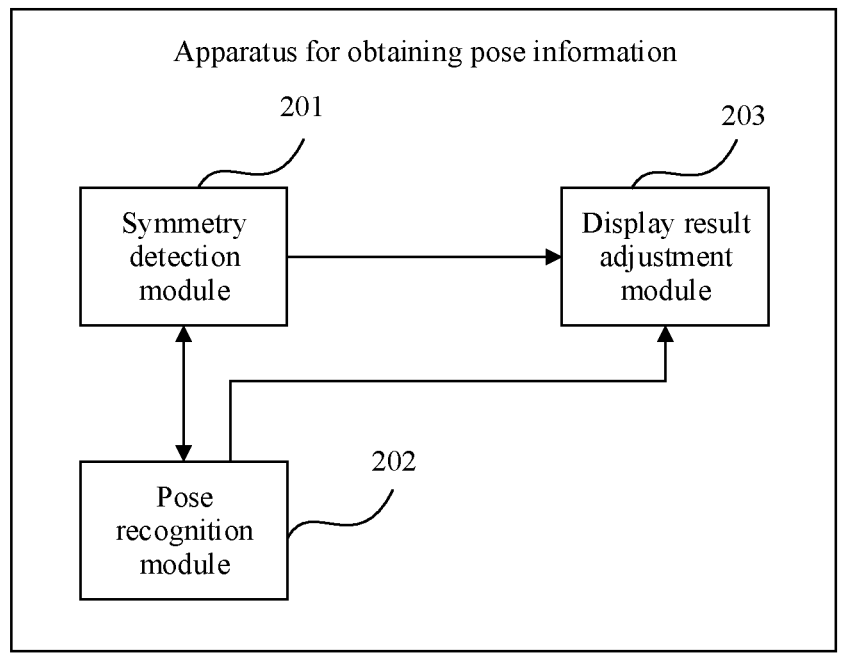
FIG. 2 is a schematic diagram depicting a structure of an apparatus for obtaining pose information according to an embodiment of this application.

FIG. 2 is a schematic diagram depicting a structure of an apparatus for obtaining pose information according to an embodiment of this application. Refer to FIG. 2. The apparatus includes a symmetry detection module 201, a pose recognition module 202, and a display result adjustment module 203.

The symmetry detection module 201 may obtain a rotational symmetry degree of freedom of a target object. The pose recognition module 202 may obtain pose information of the target object. For example, the pose recognition module 202 may be a pose detection classifier obtained in advance through training. The display result adjustment module 203 may adjust the pose information of the target object based on the rotational symmetry degree of freedom of the target object, to obtain adjusted pose information, where the adjusted pose information may be used for displaying a virtual object associated with the target object. In an optional solution, the symmetry detection module 201 may obtain, based on an object identifier, a rotational symmetry degree of freedom corresponding to the object identifier from a pre-stored rotational symmetry degree of freedom relationship table of an object. The pre-stored rotational symmetry degree of freedom relationship table of an object includes a one-to-one correspondence between an object identifier and a rotational symmetry degree of freedom. For example, the pre-stored rotational symmetry degree of freedom relationship table of an object may be stored in a local memory, or stored in a cloud or on a server side. In this case, an input of the symmetry detection module 201 is an object identifier. The object identifier may be output by the pose recognition module 202, or the object identifier may be input by a user.

In an optional case, the symmetry detection module 201 may obtain a symmetry detection result of the target object by analyzing obtained image information of the target object. In this case, an input of the symmetry detection module 201 is a 2D image of the target object, and the 2D image may be image data of the target object obtained by using a camera. It should be understood that the symmetry detection result obtained by the symmetry detection module 201 may be further used to train the pose detection classifier. The pose detection classifier may be trained offline, or may be trained and updated online in real time.

In an optional case, an input of the pose recognition module 202 is 2D image data of the target object, and the 2D image data may be image data of the target object obtained by using a camera. The pose recognition module 202 analyzes the input 2D image data to obtain an identifier and the pose information of the target object.

Figure 3:
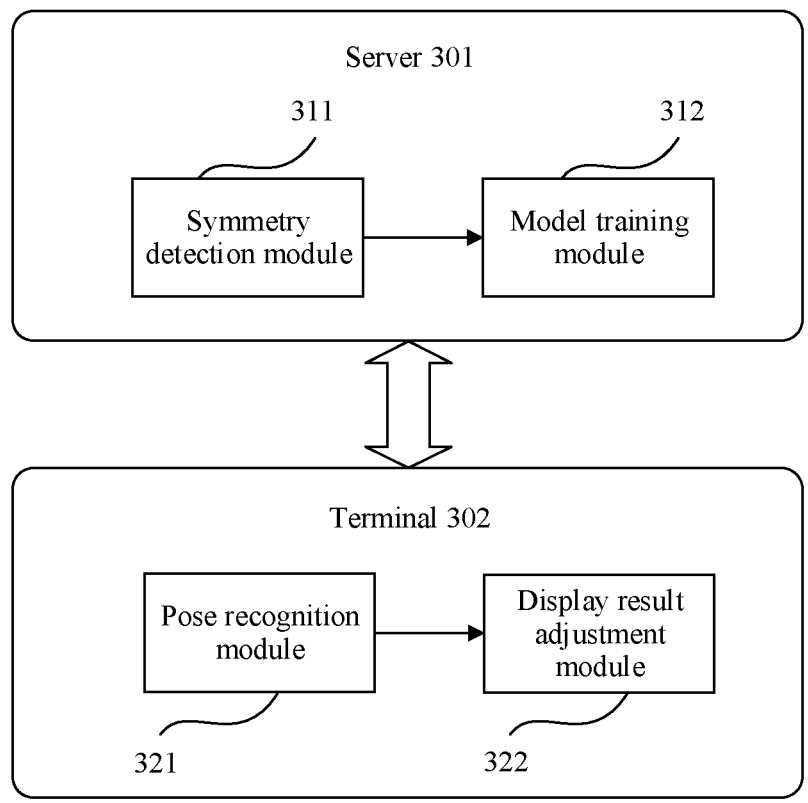
FIG. 3 is a schematic diagram of another pose recognition system according to an embodiment of this application.

FIG. 3 is a schematic diagram of a pose recognition system according to an embodiment of this application. Refer to FIG. 3. The system may include a server 301 and a terminal 302.

The server 301 may include a symmetry detection module 311 and a model training module 312. The symmetry detection module 311 may detect, based on a 3D model of a target object, whether the target object has rotational symmetry, and obtain a rotational symmetry degree of freedom of the target object when the target object has rotational symmetry. The model training module 312 may select at least some images from a plurality of images of the target object as training images based on the rotational symmetry degree of freedom of the target object, and then train a to-be-trained detection model by using the selected plurality of training images, to obtain a pose detection classifier.

The terminal 302 may include a pose recognition module 321 and a display result adjustment module 322. The pose recognition module 321 may obtain pose information of the target object. The pose recognition module 321 may be the pose detection classifier obtained through training by the server 301, and is integrated into the terminal 302. The display result adjustment module 322 may adjust the pose information of the target object based on the rotational symmetry degree of freedom of the target object, to obtain adjusted pose information, where the adjusted pose information may be used for displaying a virtual object associated with the target object.

The terminal 302 may further include a degree of freedom obtaining module, although not shown in FIG. 3. The degree of freedom obtaining module is configured to obtain the rotational symmetry degree of freedom of the target object. The rotational symmetry degree of freedom of the target object may be obtained from the server 301. In an optional solution, the server 301 stores a symmetry detection result on the terminal 302. In this case, the rotational symmetry degree of freedom of the target object may be locally obtained from the terminal 302.

Figure 4:
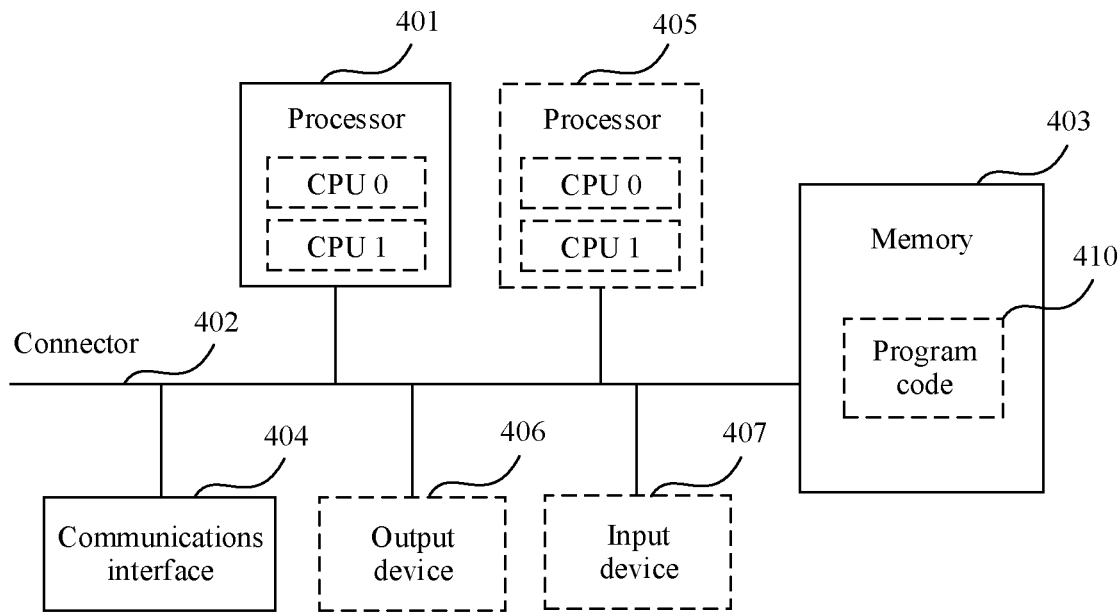
FIG. 4 is a schematic diagram depicting a structure of an apparatus according to an embodiment of this application.

FIG. 4 is a schematic diagram depicting a structure of an apparatus according to an embodiment of this application. The pose recognition system shown in FIG. 1 may be implemented by using this apparatus. Refer to FIG. 4. The apparatus includes at least one processor 401, a connector 402, a memory 403, and at least one communications interface 404.

The processor 401 may be a general-purpose central processing unit (CPU), a microprocessor, a system on chip (SOC), a processor integrated in a SOC, a separate processor chip, a controller, or the like. The processor 401 may further include a dedicated processing device, for example, an application-specific integrated circuit (ASIC), a field programmable gate array (FPGA), a digital signal processor (DSP), a dedicated video or graphics processor, a graphics processing unit (GPU), or a neural network processing unit (NPU). The processor 401 may be a processor group including a plurality of processors, and the plurality of processors are coupled to each other through one or more buses. The processor 401 may include an analog-to-digital converter (ADC) and a digital-to-analog converter (DAC), to implement signal transmission between different components of the apparatus. The processor 401 is configured to process media signals such as an image, an audio, and a video.

The foregoing components are coupled to each other through the connector 402. For example, the connector 402 includes various interfaces, transmission lines, communications buses, and the like. These interfaces are generally electrical communications interfaces, mechanical interfaces, or interfaces in other forms. This is not limited in this embodiment of this application.

The memory 403 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, another optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer. The memory 403 is not limited thereto. The memory 403 may exist independently, and is connected to the processor 401 through the connector 402. Alternatively, the memory 403 may be integrated with the processor 401.

The communications interface 404 is configured to communicate, by using any apparatus of a transceiver type, with another device or a communications network such as the Ethernet, a radio access network (RAN), or a wireless local area network (WLAN). The communications interface 404 may be a data input or output interface of a processor chip. In an optional case, the communications interface 404 may include a receiving interface and a sending interface. The communications interface 404 may be a high definition multimedia interface (HDMI), a V-by-One interface, an embedded display port (eDP), a mobile industry processor interface (MIPI), a display port (DP), or the like.

During specific implementation, in an embodiment, the processor 401 may include one or more CPUs, for example, a CPU 0 and a CPU 1 shown in FIG. 4.

During specific implementation, in an embodiment, the apparatus may include a plurality of processors, for example, the processor 401 and a processor 405 shown in FIG. 4. Each of the processors may be a single-core (single-CPU) processor or may be a multi-core (multi-CPU) processor. The processor herein may be one or more devices, circuits, and/or processing cores configured to process data (for example, computer program instructions).

During specific implementation, in an embodiment, the apparatus may further include an output device 406 and an input device 407. The output device 406 communicates with the processor 401, and may display information in a plurality of manners. For example, the output device 406 may be a liquid crystal display (LCD), a light-emitting diode (LED) display device, a cathode ray tube (CRT) display device, a projector, or the like. The input device 407 communicates with the processor 401, and may receive a user input in a plurality of manners. For example, the input device 407 may be a mouse, a keyboard, a touchscreen device, a sensor device, or the like.

The apparatus may be a general-purpose computer device or a dedicated computer device. During specific implementation, the apparatus may be a desktop computer, a laptop computer, a network server, a personal digital assistant (PDA), a mobile phone, a tablet computer, a wireless terminal device, a communications device, or an embedded device. A type of the apparatus is not limited in this embodiment of this application.

The memory 403 is configured to store program code 410 for executing the solutions of this application, and the processor 401 is configured to execute the program code 410 stored in the memory 403. The apparatus may implement, by using the processor 401 and the program code 410 in the memory 403, a method for determining symmetry of an object in the following embodiment in FIG. 5, or implement a method for obtaining pose information in the following embodiment in FIG. 9.

The following describes in detail the method for determining symmetry of an object. In a possible case, the method for determining symmetry of an object may be performed by a server in an offline training phase.

Figure 5:
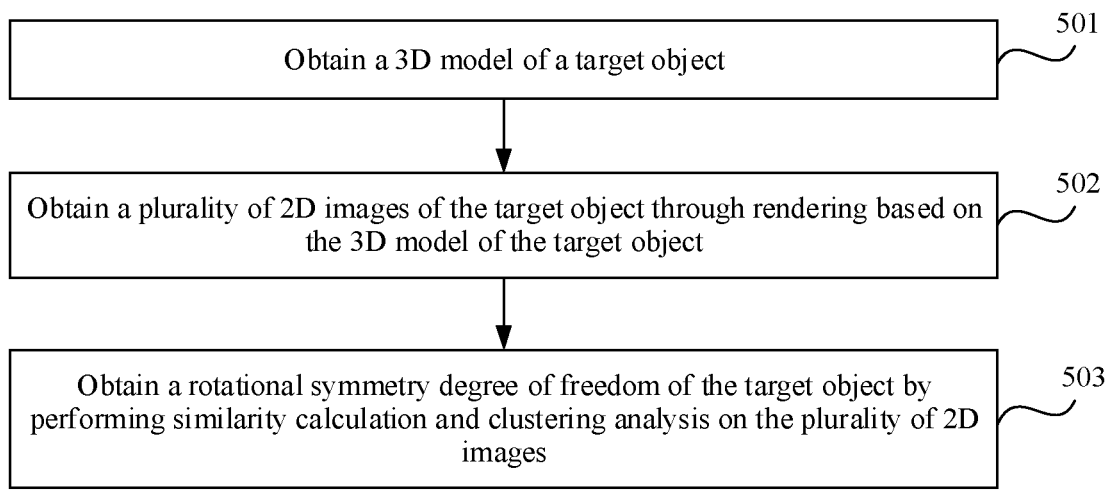
FIG. 5 is a flowchart of a method for determining symmetry of an object according to an embodiment of this application.

FIG. 5 is a flowchart of a method for determining symmetry of an object according to an embodiment of this application. Refer to FIG. 5. The method includes the following steps.

Step 501: Obtain a 3D model of a target object.

It should be noted that the target object is an object for which whether the object has rotational symmetry needs to be detected. The target object may generally be a three-dimensional object that can be viewed by a user. For example, the target object may be a speaker, a car, or a doll.

In addition, the 3D model of the target object is representation of the target object in three-dimensional space. The 3D model is a data set including various geometric entities (such as triangles, lines, and surfaces), information about colors and materials, and the like. For example, the 3D model of the target object may be a polygon mesh model. The polygon mesh model includes vertexes, polygon faces, and connection relationships between the vertexes, and may further include color information such as materials and textures. A polygon face is usually constituted by simple polygons such as triangles and quadrilaterals. For another example, the 3D model of the target object may be an implicit surface, and the implicit surface is represented by a zero set function about three-dimensional coordinates in Euclidean space, that is, $F(x,y,z)=0$.

Specifically, the 3D model of the target object may be obtained in a plurality of manners. In a possible manner, the 3D model of the target object may be directly input by a user. In another possible manner, the 3D model of the target object may be generated based on a plurality of images obtained by photographing the target object. Certainly, the 3D model of the target object may alternatively be obtained in another manner. This is not limited in this embodiment of this application.

Step 502: Obtain a plurality of 2D images of the target object through rendering based on the 3D model of the target object.

It should be noted that the plurality of 2D images may be 2D views obtained by rendering the 3D model at different perspectives. In actual application, the plurality of 2D images of the 3D model may be obtained through rendering from different perspectives by using a rendering engine (a renderer). In other words, rendering perspectives of the plurality of 2D images may be different. A rendering perspective of each of the 2D images may include a first rendering angle and a second rendering angle. In a possible case, first rendering angles of the plurality of 2D images are different, and second rendering angles of the plurality of 2D images are the same.

Specifically, the operation of step 502 may be as follows: determining a plurality of reference viewpoints from a coordinate system, and then obtaining 2D images by rendering the 3D model by using all the plurality of reference viewpoints as observation positions.

It should be noted that the origin of the coordinate system is a center point of the 3D model, a first coordinate axis of the coordinate system is a rotational axis of the 3D model, a second coordinate axis of the coordinate system is perpendicular to the first coordinate axis, and a third coordinate axis of the coordinate system is perpendicular to both the first coordinate axis and the second coordinate axis. In other words, the coordinate system may be constructed based on the center point and the rotational axis of the 3D model.

In addition, the plurality of reference viewpoints are all coordinate points in the coordinate system. The 3D model may be observed by using the reference viewpoints as observation positions, and then 2D views that are viewed at the observation positions are rendered, to obtain the 2D images of the 3D model.

The center point and the rotational axis of the 3D model may be determined in a plurality of manners. In a possible manner, a preset center point may be used as the center point of the 3D model, and a straight line in which a preset gravity direction is located is used as the rotational axis of the 3D model. In another possible manner, a center point of a bounding box of the 3D model may be used as the center point of the 3D model, and the rotational axis of the 3D model is determined based on the center point of the 3D model by using a principal component analysis method. Certainly, the center point and the rotational axis of the 3D model may alternatively be determined in another manner. This is not limited in this embodiment of this application.

It should be noted that both the preset center point and the preset gravity direction may be set in advance. For example, when inputting the 3D model, a user may input the preset center point and the preset gravity direction.

In addition, the bounding box of the 3D model is enclosed space that completely encloses the 3D model. The 3D model is surrounded by using a simple bounding box, and a shape of the simple bounding box is used as an approximate shape of the 3D model. Therefore, a center point of the bounding box of the 3D model may be directly used as the center point of the 3D model.

In addition, when the rotational axis of the 3D model is determined based on the center point of the 3D model by using the principal component analysis method, a position of the center point of the 3D model may be first subtracted from positions of k vertexes of the 3D model, to obtain k position differences. Each of the k position differences includes differences in three main directions (transverse, longitudinal, and vertical directions). Each of the k position differences is used as each column of elements in a first matrix, to obtain the first matrix, where the first matrix is a matrix of three rows and k columns. The first matrix is multiplied by a transpose of the first matrix to obtain a second matrix, where the second matrix is a matrix with three rows and three columns. Eigenvalues and eigenvectors of the second matrix are determined. A straight line in which an eigenvector corresponding to a largest eigenvalue in the eigenvalues of the second matrix is located is used as the rotational axis of the 3D model.

For example, the 3D model has four vertexes; positions of the four vertexes of the 3D model are (1, 1, 3), (5, 1, 3), (1, 7, 3), and (5, 7, 3); and a position of the center point of the 3D model is (3, 4, 3). The position of the center point of the 3D model is subtracted from each of the positions of the four vertexes of the 3D model, to obtain four position differences: (−2, −3, 0), (2, −3, 0), (−2, 3, 0), and (2, 4, 0). Each of the four position differences is used as elements of each column of a first matrix, to obtain the first matrix. For example, the first matrix may be the following matrix with three rows and four columns.

The first matrix is:

$$\begin{bmatrix} -2 & 2 & -2 & 2 \\ -3 & -3 & 3 & 3 \\ 0 & 0 & 0 & 0 \end{bmatrix}.$$

The plurality of reference viewpoints may be determined from the coordinate system in a plurality of manners. In a possible manner, a plurality of coordinate points may be randomly selected from the coordinate system as the plurality of reference viewpoints. In another possible manner, a plurality of first coordinate points may be determined from the coordinate system. A first included angle of each of the first coordinate points is 0 degrees. A second included angle of each of the first coordinate points is greater than 0 degrees and less than or equal to a preset angle. First reference images are obtained by rendering the 3D model by using all the plurality of first coordinate points as observation positions. A second included angle of a first coordinate point corresponding to a first reference image with a largest area in the plurality of obtained first reference images is determined as a second rendering angle. Each of a plurality of second coordinate points in the coordinate system is determined as a reference viewpoint. A first included angle of each of the second coordinate points is a first rendering angle. A first rendering angle of each coordinate point is greater than 0 degrees and less than or equal to 360 degrees. A second included angle of each of the second coordinate points is the determined second rendering angle.

It should be noted that the preset angle may be set in advance. For example, the preset angle may be 180 degrees or 360 degrees. This is not limited in this embodiment of this application.

In addition, first included angles of the plurality of first coordinate points are the same, and are all 0 degrees. Second included angles of the plurality of first coordinate points may be different. To be specific, the second included angles of the plurality of first coordinate points may be different angles within [0, preset angle] (unit: degree). First included angles of the plurality of second coordinate points may be different. To be specific, the first included angles of the plurality of second coordinate points may be different angles within [0, 360] (unit: degree). Second included angles of the plurality of second coordinate points are the same, and are all the second included angle of the first coordinate point corresponding to the first reference image with the largest area in the plurality of first reference images.

Figure 7:
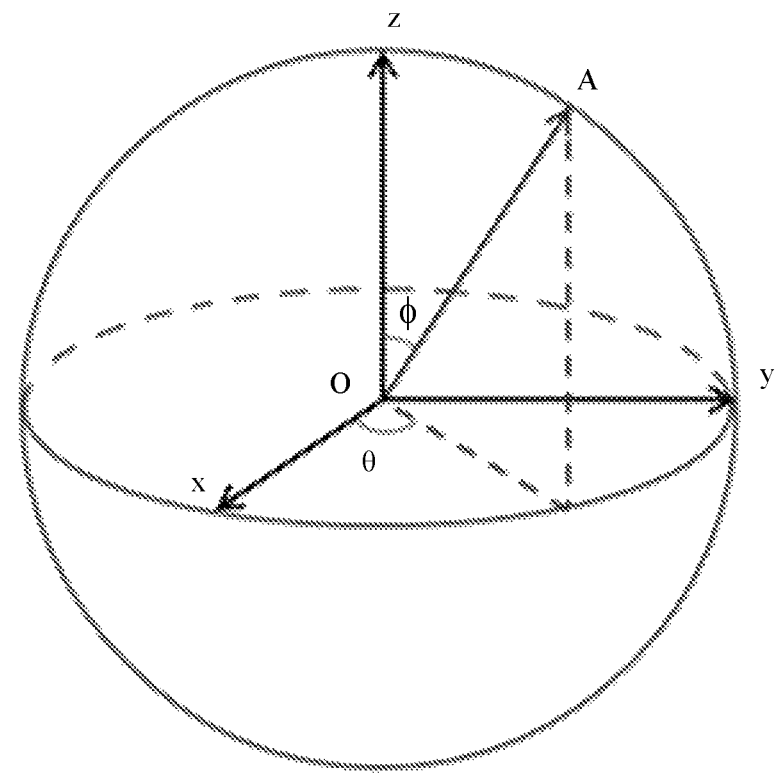
FIG. 7 is a schematic diagram of a first included angle and a second included angle according to an embodiment of this application.

In addition, the first included angle is an included angle between a projection of a line connecting a coordinate point and the origin on a target plane and a positive side of the second coordinate axis, the second included angle is an included angle between the line connecting the coordinate point and the origin and a positive side of the first coordinate axis, and the target plane is a plane on which the second coordinate axis and the third coordinate axis are located. For example, as shown in FIG. 7, the origin of the coordinate system is a point O, the first coordinate axis is a z-axis, the second coordinate axis is an x-axis, the third coordinate axis is a y-axis, and a plane on which the x-axis and the y-axis are located is the target plane. Assuming that the first coordinate point is a coordinate point A, a first included angle of the coordinate point A is an included angle between a projection of a line segment OA on the target plane and a positive side of the x-axis, that is, an angle θ; and a second included angle of the coordinate point A is an included angle between the line segment OA and a positive side of the z-axis, that is, an angle φ.

Finally, for the 3D model, when a first reference image is obtained through rendering by using a first coordinate point as an observation position, the first coordinate point corresponds to the first reference image. Similarly, for the 3D model, when a 2D image is obtained through rendering by using a reference viewpoint as an observation position, the reference viewpoint corresponds to the 2D image, and a rendering perspective of the 2D image includes a first included angle and a second included angle of the reference viewpoint. For example, a first rendering angle is the first included angle, and a second rendering angle is the second included angle. When the second rendering angle is fixedly an angle φ1, a plurality of 2D images at a plurality of different first rendering angles corresponding to the second rendering angle φ1 are obtained. In this way, when checking is subsequently performed from a plurality of perspectives, a second rendering angle φ2 other than the angle φ1 may be used to obtain a plurality of 2D images at a plurality of different first rendering angles corresponding to the second rendering angle φ2. Further, a second rendering angle φ3 may be used to obtain a plurality of 2D images at a plurality of different first rendering angles corresponding to the second rendering angle φ3.

It should be noted that, for the first coordinate point corresponding to the first reference image with the largest area in the plurality of obtained first reference images, it can be learned that a 2D image that is obtained through rendering by using the second included angle of the first coordinate point as a main observational angle has a largest area, because the first included angle of the first coordinate point is 0 degrees. Therefore, in this case, a second coordinate point whose second included angle is a second included angle of the first coordinate point and whose first included angle is any angle within [0, 306] (unit: degree) in the coordinate system may be used as a reference viewpoint, so that a 2D image with complete and comprehensive shape and texture information can be obtained subsequently based on the reference viewpoint.

Step 503: Obtain the rotational symmetry degree of freedom of the target object by performing similarity calculation and clustering analysis on the plurality of 2D images.

Figure 6:
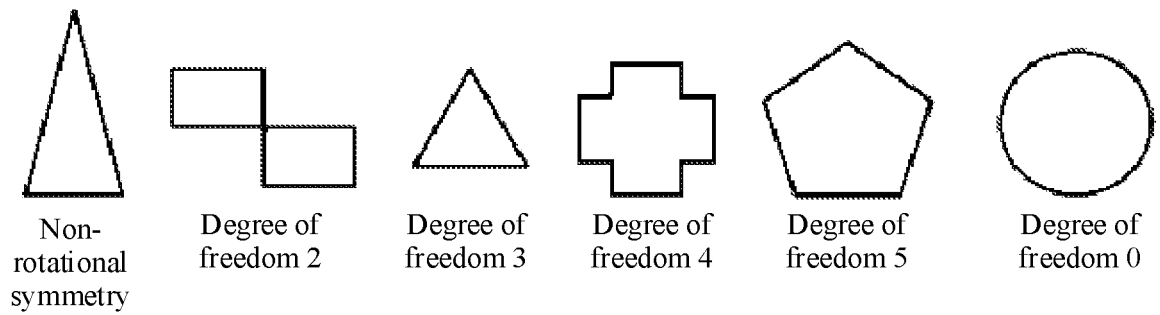
FIG. 6 is a schematic diagram of a rotational symmetry degree of freedom according to an embodiment of this application.

It should be noted that, the rotational symmetry degree of freedom may be represented by N, where N is a natural number. The rotational symmetry degree of freedom equal to N indicates that an object that rotates by 360/N degrees around a rotational axis can completely coincide with the object before the rotation. The rotational symmetry degree of freedom equal to 0 indicates that the object that rotates by any angle around the rotational axis can completely coincide with the object before the rotation. For example, rotation axes of six objects shown in FIG. 6 are straight lines passing through center points of the six objects and perpendicular to a plane on which the six objects are located. A first object does not have rotational symmetry, the other five objects have rotational symmetry, and rotational symmetry degrees of freedom of the other five objects are 2, 3, 4, 5, and 0, respectively.

In addition, the plurality of 2D images are obtained through rendering based on the 3D model of the target object. Therefore, after similarity calculation and clustering analysis are performed on the plurality of 2D images, symmetry of the target object may be determined, and the rotational symmetry degree of freedom of the target object may be obtained accordingly.

Specifically, the operation of step 503 may include the following step (1) to step (5).

(1) Sample the plurality of 2D images based on a plurality of rotational symmetry degrees of freedom, to obtain a plurality of image pairs.

It should be noted that each rotational symmetry degree of freedom corresponds to at least one image pair. To be specific, for any one of the plurality of rotational symmetry degrees of freedom, the plurality of 2D images can be sampled based on the rotational symmetry degree of freedom, to obtain at least one image pair corresponding to the rotational symmetry degree of freedom.

In addition, for any one of the plurality of image pairs, the image pair may include two 2D images, first rendering angles of the two 2D images included in the image pair differ by 360/N degrees, where N is a rotational symmetry degree of freedom corresponding to the image pair. For example, if the rotational symmetry degree of freedom corresponding to the image pair is 2, the first rendering angles of the two 2D images included in the image pair differ by 180 degrees. For example, the image pair includes a first 2D image and a second 2D image, a second rendering angle of the first 2D image and a second rendering angle of the second 2D image are both an angle $\varphi1$, a first rendering angle of the first 2D image is an angle $\theta1$, and a first rendering angle of the second 2D image is an angle $\theta2$. The angle $\theta1$ and the angle $\theta2$ differ by 180 degrees.

Specifically, the operation of step (1) may be specifically as follows: for any one of the plurality of rotational symmetry degrees of freedom, dividing 360 degrees by the rotational symmetry degree of freedom, to obtain a rotation angle; and obtaining, from the plurality of 2D images based on the rotation angle, at least one image pair corresponding to the rotational symmetry degree of freedom, where a difference between first rendering angles (namely, first included angles of reference viewpoints corresponding to the two 2D images) of two 2D images included in each image pair is the rotation angle.

It should be noted that, the rotation angle obtained by dividing 360 degrees by the rotational symmetry degree of freedom may be referred to as a rotation angle indicated by the rotational symmetry degree of freedom.

In addition, when the at least one image pair corresponding to the rotational symmetry degree of freedom is obtained from the plurality of 2D images based on the rotation angle, for any one of the plurality of 2D images, a first included angle of a reference viewpoint corresponding to the 2D image is first added to the rotation angle to obtain a specified angle, then a reference viewpoint whose first included angle is the specified angle is selected from the plurality of reference viewpoints, and further the 2D image and a 2D image corresponding to the selected reference viewpoint form an image pair.

(2) Calculate similarities of all the plurality of image pairs.

It should be noted that a similarity of each image pair is a similarity between two 2D images included in the image pair. To be specific, a higher similarity of an image pair indicates that two 2D images included in the image pair are more similar, and a lower similarity of an image pair indicates that two 2D images included in the image pair are less similar.

Specifically, for any one of the plurality of image pairs, a similarity of the image pair may be calculated in a plurality of manners. In a possible manner, a similarity between two 2D images may be determined based on a difference between the two 2D images. A smaller difference indicates a higher similarity, and the two 2D images are also more similar. For example, a Euclidean distance between image features of two 2D images included in the image pair may be calculated, and a value obtained by subtracting the calculated Euclidean distance from 1 is determined as the similarity of the image pair. A smaller Euclidean distance indicates a higher similarity, and two 2D images are more similar. In another possible manner, a cosine distance between image features of two 2D images included in the image pair may be calculated, and the calculated cosine distance is determined as the similarity of the image pair. Certainly, the similarity of the image pair may alternatively be calculated in another manner. This is not limited in this embodiment of this application.

It should be noted that an image feature of a 2D image may represent image content of the 2D image. An operation of obtaining an image feature of a 2D image is similar to an operation of obtaining an image feature of an image in a related technology. This is not described in detail in this embodiment of this application. For example, the 2D image may be input into a neural network model, and the neural network model outputs the image feature of the 2D image. The neural network model may be set in advance. For example, the neural network model may be a convolutional neural network (Convolutional Neural Network, CNN) model. In this case, the image feature of the 2D image may be a 1*M-dimensional vector, where M is a positive integer.

(3) Perform clustering analysis on the plurality of image pairs based on the similarities and the rotational symmetry degrees of freedom, to obtain a plurality of image sets.

It should be noted that, for any one of the plurality of image sets obtained through clustering analysis, a difference between a highest similarity of all image pairs in an image set and a lowest similarity of all the image pairs in the image set is less than or equal to a preset value. In this case, similarities of all the image pairs in the image set are approximate. In other words, the similarities of all the image pairs in the image set fall within a similarity interval, and an interval length of the similarity interval is the preset value. The preset value may be set in advance, and the preset value may be set to a small value. In addition, all the image pairs in the image set have a same rotational symmetry degree of freedom. In other words, the image set corresponds to one similarity interval and one rotational symmetry degree of freedom.

For example, when the preset value is 0, it indicates that all the image pairs in the image set have a same similarity. In this case, for any one of the plurality of image sets, all image pairs in the image set have a same similarity. In other words, the image set corresponds to one similarity and one rotational symmetry degree of freedom.

(4) Determine an image set having a largest quantity of image pairs in the plurality of image sets as a target image set.

It should be noted that, because the target image set is an image set that includes the largest quantity of image pairs in the plurality of image sets, the image pairs included in the target image set can better reflect symmetry of the target object. Therefore, the symmetry of the target object may be determined based on the target image set.

(5) When a lowest similarity of all image pairs in the target image set is greater than a similarity threshold, determine a rotational symmetry degree of freedom corresponding to the target image set as the rotational symmetry degree of freedom of the target object.

It should be understood that, when a similarity between two 2D images is determined based on a difference between the two 2D images, if the similarity of the image pair is greater than the similarity threshold, it indicates that the difference of the image pair is less than a threshold.

It should be noted that, if the lowest similarity of all the image pairs in the target image set is less than or equal to the similarity threshold, it is determined that the target object does not have rotational symmetry.

In addition, the similarity threshold may be set in advance, and the similarity threshold may be set to a large value. For example, the similarity threshold may be set to 80% or 90%. This is not limited in this embodiment of this application.

Furthermore, when the lowest similarity of all the image pairs in the target image set is greater than the similarity threshold, it indicates that similarities of all of the image pairs in the target image set are high. It also indicates that, after rotating by a rotation angle indicated by the rotational symmetry degree of freedom corresponding to the target image set, the target object probably coincides with the target object before the rotation. Therefore, it can be determined that the target object has rotational symmetry, and the rotational symmetry degree of freedom corresponding to the target image set can be determined as the rotational symmetry degree of freedom of the target object.

When the lowest similarity of all the image pairs in the target image set is less than or equal to the similarity threshold, it indicates that similarities of some of the image pairs in the target image set are low. It also indicates that, after rotating by the rotation angle indicated by the rotational symmetry degree of freedom corresponding to the target image set, the target object probably cannot coincide with the target object before the rotation. Therefore, it can be determined that the target object does not have rotational symmetry.

It should be noted that, when the second rendering angles of the plurality of 2D images obtained in step 502 are the same, to improve accuracy in determining symmetry of the target object, the operation of determining the rotational symmetry degree of freedom corresponding to the target image set as the rotational symmetry degree of freedom of the target object in step (5) may be as follows: obtaining 2D images at a plurality of different second rendering angles of the 3D model through rendering; sampling the 2D images at the plurality of different second rendering angles based on the rotational symmetry degree of freedom corresponding to the target image set, to obtain image pairs at the plurality of different second rendering angles; when similarities of all the image pairs at the plurality of different second rendering angles are all greater than the similarity threshold, determining that the target object has rotational symmetry, and determining the rotational symmetry degree of freedom corresponding to the target image set as the rotational symmetry degree of freedom of the target object.

It should be understood that the second rendering angle is a second included angle of a coordinate point that is used as an observation position, and whether the target object has rotational symmetry can be verified at different rendering angles by changing the second rendering angle.

It should be noted that the second rendering angles of the plurality of 2D images obtained in step 502 are the same, and the first rendering angles are a plurality of different angles within [0, 360] (unit: degree). The plurality of different second rendering angles indicate different values of second included angles of coordinate points that are used as observation positions, and the plurality of different second rendering angles may be all different from the second rendering angles of the plurality of 2D images. For example, the second rendering angles of the plurality of 2D images are all 30 degrees, the plurality of different second rendering angles may be 60 degrees, 120 degrees, or 180 degrees, or the plurality of different second rendering angles may be any angle within [0, 360] (unit: degree) other than the second rendering angles of the plurality of 2D images. In addition, the 2D images at the plurality of different second rendering angles of the 3D model obtained through rendering may be 2D images at the plurality of different second rendering angles and a plurality of different first rendering angles obtained by rendering the 3D model.

In addition, in this embodiment of this application, the target object may be checked from a plurality of perspectives. In other words, the 2D images may be re-obtained at a plurality of different second rendering angles to check symmetry of the target object based on the 2D images at the plurality of different second rendering angles. After the checking performed from the plurality of perspectives succeeds, it can be determined that the target object has rotational symmetry, and the rotational symmetry degree of freedom corresponding to the target image set can be determined as the rotational symmetry degree of freedom of the target object. This can improve accuracy of determining whether the object has symmetry.

Further, after the rotational symmetry degree of freedom of the target object is obtained in step 503, pose detection and tracking for the object may be performed based on the rotational symmetry degree of freedom of the target object. A specific process is as follows:

Step 1: Train images of the target object based on the rotational symmetry degree of freedom of the target object, to obtain a pose detection classifier. Specifically, a plurality of images of the target object and pose information of the target object in each of the images may be obtained. Images whose yaw angles in pose information are greater than 0 degrees and less than a rotation angle are selected from the plurality of images as training images, where the rotation angle is a ratio of 360 to the rotational symmetry degree of freedom of the target object. A to-be-trained detection model is trained by using the plurality of selected training images as input samples and by using the pose information of the target object in each of the plurality of training images and an identifier of the target object as sample labels, to obtain the pose detection classifier.

It should be noted that, the plurality of images of the target object may be generated based on the 3D model of the target object. In this case, pose information of the target object in an image of the target object may be directly determined by a rendering engine. Certainly, the plurality of images of the target object may alternatively be obtained by photographing the target object. In this case, pose information of the target object in an image of the target object may be obtained through manual labeling by a user. Certainly, the plurality of images of the target object and pose information of the target object in each image may alternatively be obtained in another manner. This is not limited in this embodiment of this application.

Figure 8:
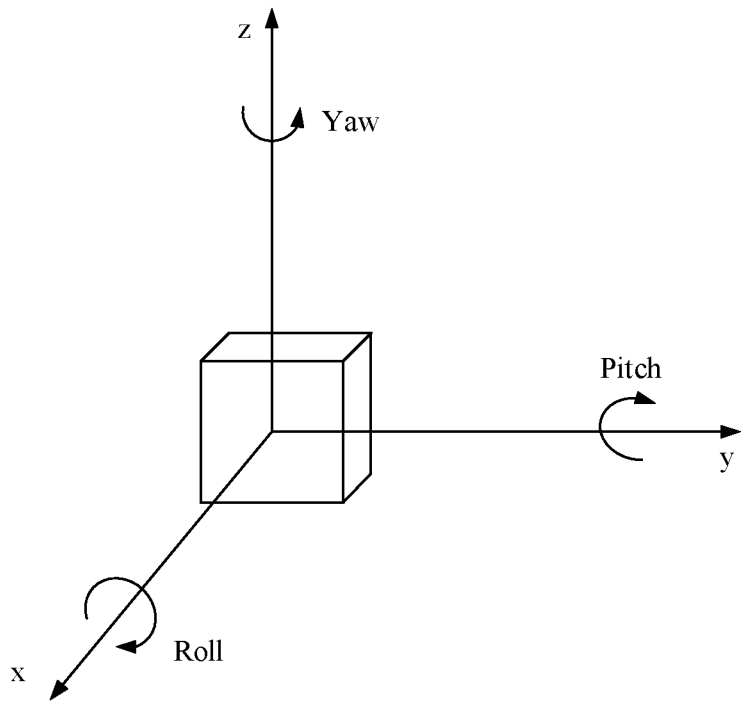
FIG. 8 is a schematic diagram of pose information according to an embodiment of this application.

In addition, pose information of an object refers to a pose of the object relative to a camera. The pose information may be 6-DoF pose information (x,y,z,yaw, pitch,roll). As shown in FIG. 8, x represents front-to-back translation of the object relative to the camera, that is, x represents front-to-back displacement; y represents left-to-right translation of the object relative to the camera, that is, y represents left-to-right displacement; z represents an up-to-down translation of the object relative to the camera, that is, z represents up-to-down displacement; yaw represents a yaw angle, which is an angle by which the object rotates around the z axis; pitch represents a pitch angle, which is an angle by which the object rotates around the y axis; and roll represents a roll angle, which is an angle by which the object rotates around the x axis. Generally, the yaw angle is an angle by which the object rotates about the rational axis.

In addition, an identifier of the object is used to identify the object. For example, the identifier of the object may be a name or a category of the object. Optionally, the identifier of the object may alternatively be a number of the object, for example, a numerical number or a letter number. This is not limited in this embodiment of this application.

It should be noted that, because an image whose yaw angle is greater than the rotation angle in the plurality of images is the same as an image whose yaw angle is greater than 0 degrees and less than the rotation angle in the plurality of images, the image whose yaw angle is greater than the rotation angle in the plurality of images may be filtered out, and only the image whose yaw angle is greater than 0 degrees and less than the rotation angle is selected as a training image to train the to-be-trained detection model. This can improve performance of the pose detection classifier obtained through training.

Specifically, the operation of training the to-be-trained detection model by using the plurality of selected training images as input samples and by using the pose information of the target object in each of the plurality of training images and the identifier of the target object as sample labels, to obtain the pose detection classifier is similar to a process of training a module in a related technology. This is not described in detail in this embodiment of this application.

For example, each of the plurality of training images may be input into the to-be-trained detection model. After an output of the detection model is obtained, parameters in the detection model are adjusted based on a difference between the output of the detection model and a sample label of each of the plurality of training images by using a preset loss function. A detection model whose parameters are adjusted is the pose detection classifier.

It should be noted that the preset loss function may be set in advance. For example, the preset loss function may be $\lambda_{pose}L_{pose}+\lambda_{conf}L_{conf}+\lambda_{cls}L_{cls}$. $L_{pose}$ represents a loss function for pose prediction, $L_{conf}$ represents a loss function for confidence, $L_{cls}$ represents a loss function for object classification, $\lambda_{pose}$ represents a weight coefficient of $L_{pose}$, $\lambda_{conf}$ represents a weight coefficient of $L_{conf}$, and $\lambda_{cls}$ represents a weight coefficient of $L_{conf}$.

In addition, the loss function for pose prediction $L_{pose}$ is represented by a distance between a true value $y_i$ and a predicted value $\hat{y}_i$, that is $$L_{pose} = \sum_i (y_i - \hat{y}_i)^2.$$

The loss function for confidence $L_{conf}$ is represented by a distance between a true value $c_i$ and a predicted value $\hat{c}_i$, that is, $$L_{conf} = \sum_i (c_i - \hat{c}_i)^2.$$

The loss function for object classification $L_{cls}$ is represented by a cross entropy between a true value $p_i$ and a predicted value $\hat{p}_i$, that is, $$L_{cls} = -\sum_i p_i \log \hat{p}_i.$$

Step 2: Recognize a pose of an object by using the pose detection classifier. Specifically, image data obtained by photographing the target object may be input into the pose detection classifier, and the image data is analyzed by using the pose detection classifier, to obtain the pose information of the target object.

It should be noted that the image data may be an RGB image or an RGBD image. This is not limited in this embodiment of this application. After the image data is input into the pose detection classifier, the pose detection classifier may output the identifier of the target object and position information of projection points corresponding to the center point and vertexes of the target object that are included in the image data; or the pose detection classifier may output the identifier of the target object and the pose information of the target object that are included in the image data.

When the image data is analyzed by using the pose detection classifier to obtain the pose information of the target object, if the pose detection classifier outputs the identifier of the target object and the position information of the projection points corresponding to the center point and the vertexes of the target object that are included in the image data, a 3D model corresponding to the identifier of the target object may be obtained. The pose information of the target object is determined based on the 3D model and the position information.

It should be noted that for the operation of determining the pose information of the target object based on the 3D model and the position information, refer to a related technology. This is not limited in this embodiment of this application. For example, the pose information of the target object may be determined based on the 3D model and the position information by using a perspective-n-point (perspective-n-point, PnP) algorithm.

Further, in actual application, the virtual object often needs to be displayed in an image. For example, when users are in shopping malls or visit museums or exhibition halls, interpretations of products or exhibits are displayed in images obtained by photographing the products or the exhibits, to achieve a virtual-real fusion display effect. In this case, when the target object has rotational symmetry, the rotational symmetry degree of freedom of the target object and the pose information of the target object may be obtained. The pose information of the target object is adjusted based on the rotational symmetry degree of freedom of the target object, to obtain adjusted pose information, where the adjusted pose information is used for displaying the virtual object. Then, the virtual object may be displayed based on the adjusted pose information.

It should be noted that the pose information of the target object is usually used to indicate a pose of the target object relative to a camera. In this case, the pose information of the target object is obtained as follows: The image data obtained by photographing the target object may be input into the pose detection classifier, and the image data is analyzed by using the pose detection classifier, to obtain the pose information of the target object.

In addition, the virtual object is usually an object associated with the target object. For example, the virtual object may be interpretations and label information of the target object. The virtual object may be obtained based on the identifier of the target object. In other words, after the identifier of the target object is obtained, the virtual object corresponding to the identifier of the target object may be obtained from a correspondence between an object identifier and a virtual object.

The operation of adjusting the pose information of the target object based on the rotational symmetry degree of freedom of the target object, to obtain adjusted pose information may be as follows: determining pose information other than the yaw angle in the pose information of the target object as the adjusted pose information; and when the rotational symmetry degree of freedom of the target object is 0 degrees, determining that a yaw angle in the adjusted pose information is 0 degrees; when the rotational symmetry degree of freedom of the target object is 0 degrees and a yaw angle in the pose information is 0 degrees, determining that the pose information of the target object is correct and does not need to be adjusted; or when the rotational symmetry degree of freedom of the target object is not 0 degrees, determining the yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N} * t, \frac{360}{N} * (t+1)\right), t = \lfloor yaw_1 * N / 360 \rfloor \end{cases}.$$

It should be noted that, $yaw_2$ represents the yaw angle in the adjusted pose information, $yaw_1$ represents the yaw angle in the pose information of the target object, and N represents the rotational symmetry degree of freedom of the target object. It can be deduced from the foregoing formula that, when the rotational symmetry degree of freedom of the target object is not 0 degrees but the yaw angle is within [0, 360/N), $yaw_2=yaw_1$, and the pose information of the target object is correct and does not need to be adjusted.

In this case, the pose information of the target object is (x,y,z,$yaw_1$, pitch,roll), and pose information of the virtual object is (x,y,z,$yaw_2$, pitch,roll). In addition, when the rotational symmetry degree of freedom of the target object is 0 degrees, $yaw_2$ is 0 degrees; or when the rotational symmetry degree of freedom of the target object is not 0 degrees, $yaw_2$ is determined according to the foregoing formula. In this way, the pose information of the virtual object can be adaptively adjusted based on the rotational symmetry degree of freedom of the target object, so that a virtual-real fusion display result may be displayed at an optimal display angle relative to a camera. This improves viewing experience of users.

When the virtual object is displayed based on the adjusted pose information, the virtual object may be displayed, based on a pose of the virtual object, in a preset area in image data obtained by photographing the target object.

It should be noted that the preset area may be set in advance. For example, the preset area may be an area near a position of the target object. Certainly, the preset area may alternatively be another area. This is not limited in this embodiment of this application.

In this embodiment of this application, after the 3D model of the target object is obtained, the plurality of 2D images of the target object are obtained through rendering based on the 3D model. Then, the rotational symmetry degree of freedom of the target object is obtained by performing similarity calculation and clustering analysis on the plurality of 2D images. In this way, whether the target object has rotational symmetry can be accurately identified, and the rotational symmetry degree of freedom of the target object can be obtained when the target object has rotational symmetry. This helps reduce difficulties in pose recognition for an object during pose detection and tracking, and improve accuracy of pose recognition for the object.

The following describes in detail a method for obtaining pose information provided in an embodiment of this application. In a possible case, the method for obtaining pose information may be performed by a terminal in an offline training phase.

Figure 9:
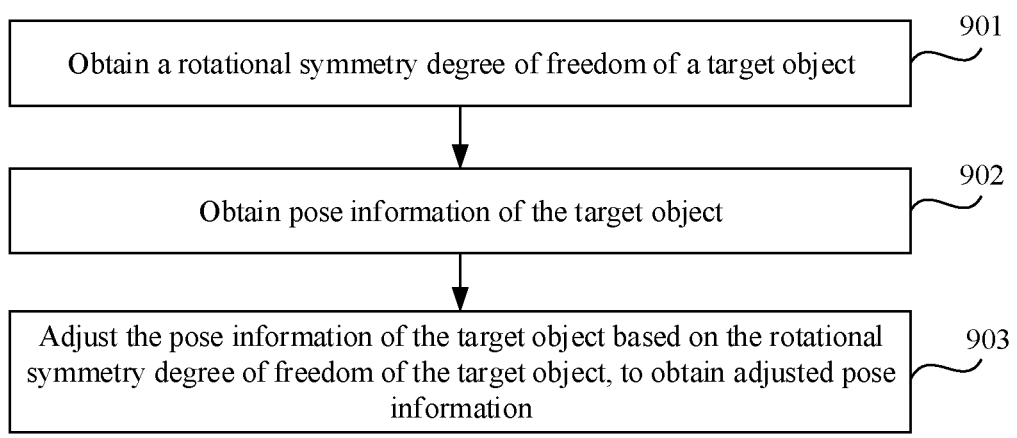
FIG. 9 is a flowchart of a method for obtaining pose information according to an embodiment of this application.

FIG. 9 is a flowchart of a method for obtaining pose information according to an embodiment of this application. Refer to FIG. 9. The method includes the following steps.

Step 901: Obtain a rotational symmetry degree of freedom of a target object.

Specifically, step 901 may be implemented in any one of the following several possible manners.

In a first possible manner, an identifier of the target object is obtained, and a rotational symmetry degree of freedom corresponding to the identifier of the target object is used as the rotational symmetry degree of freedom of the target object.

The identifier of the target object input by a user may be obtained. Alternatively, image data obtained by photographing the target object may be input into a pose detection classifier, and the pose detection classifier outputs the identifier of the target object. Certainly, the identifier of the target object may alternatively be obtained in another manner. This is not limited in this embodiment of this application.

The rotational symmetry degree of freedom corresponding to the identifier of the target object may be obtained from a stored correspondence between an object identifier and a rotational symmetry degree of freedom based on the identifier of the target object; or the identifier of the target object may be sent to a server, and the server returns the rotational symmetry degree of freedom corresponding to the identifier.

It should be noted that the pre-stored correspondence between an object identifier and a rotational symmetry degree of freedom may be input by a user, may be obtained from a server, may be preset on a device before delivery, or the like. This is not limited in this embodiment of this application.

In a second possible manner, the rotational symmetry degree of freedom of the target object input by a user is obtained.

In a third possible manner, an identifier of the target object is obtained; a 3D model corresponding to the identifier of the target object is obtained; a plurality of 2D images of the target object are obtained through rendering based on the 3D model; and the rotational symmetry degree of freedom of the target object is obtained by performing similarity calculation and clustering analysis on the plurality of 2D images.

The identifier of the target object input by a user may be obtained. Alternatively, image data obtained by photographing the target object may be input into a pose detection classifier, and the pose detection classifier outputs the identifier of the target object. Certainly, the identifier of the target object may alternatively be obtained in another manner. This is not limited in this embodiment of this application.

The 3D model corresponding to the identifier of the target object may be obtained from a stored correspondence between an object identifier and a 3D model based on the identifier of the target object. The 3D model corresponding to the identifier of the target object is a 3D model of the target object. The pre-stored correspondence between an object identifier and a 3D model may be input by a user, may be obtained from a server, may be preset on a device before delivery, or the like. This is not limited in this embodiment of this application.

For the operations of obtaining a plurality of 2D images of the target object through rendering based on the 3D model and obtaining the rotational symmetry degree of freedom of the target object by performing similarity calculation and clustering analysis on the plurality of 2D images, refer to related steps in the method for determining symmetry of an object provided in the embodiment in FIG. 5. Details are not described again in this embodiment of this application.

Step 902: Obtain pose information of the target object.

Specifically, the image data obtained by photographing the target object may be input into the pose detection classifier, and the image data is analyzed by using the pose detection classifier, to obtain the pose information of the target object.

It should be noted that for a specific operation of step 902, refer to related steps in the method for determining symmetry of an object provided in the embodiment in FIG. 5. Details are not described again in this embodiment of this application.

Step 903: Adjust the pose information of the target object based on the rotational symmetry degree of freedom of the target object, to obtain adjusted pose information.

It should be noted that the adjusted pose information is used for displaying a virtual object, and the virtual object is an object associated with the target object.

In addition, for a specific operation of step 903, refer to related steps in the method for determining symmetry of an object provided in FIG. 5. Details are not described in this embodiment of this application.

In this embodiment of this application, the rotational symmetry degree of freedom of the target object and the pose information of the target object are obtained. Then, the pose information of the target object is adjusted based on the rotational symmetry degree of freedom to obtain the adjusted pose information, where the adjusted pose information is used for displaying the virtual object, and the virtual object is an object associated with the target object. In this way, pose information of the virtual object can be adaptively adjusted based on the rotational symmetry degree of freedom of the target object, so that a virtual-real fusion display result may be displayed at an optimal display angle relative to a camera. This improves viewing experience of users.

Figure 10:
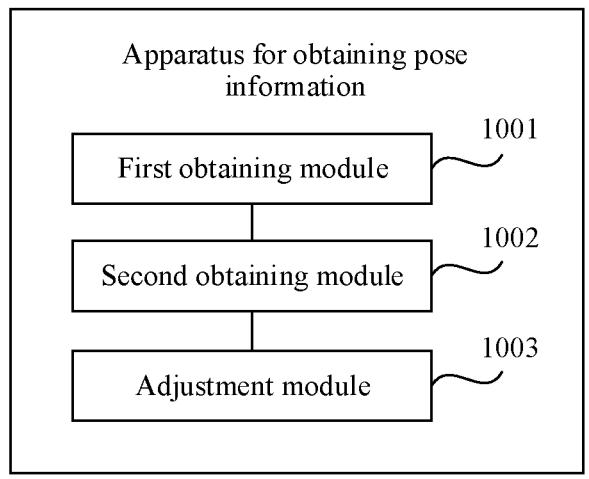
FIG. 10 is a schematic diagram depicting a structure of another apparatus for obtaining pose information according to an embodiment of this application.

FIG. 10 is a schematic diagram depicting a structure of an apparatus for obtaining pose information according to an embodiment of this application. The apparatus may be implemented as a part or all of a computer device by using software, hardware, or a combination thereof. The computer device may be the apparatus shown in FIG. 4. Refer to FIG. 10. The apparatus includes a first obtaining module 1001, a second obtaining module 1002, and an adjustment module 1003.

The first obtaining module 1001 is configured to perform step 901 in the embodiment in FIG. 9.

The second obtaining module 1002 is configured to perform step 902 in the embodiment in FIG. 9.

The adjustment module 1003 is configured to perform step 903 in the embodiment in FIG. 9.

Optionally, the first obtaining module 1001 is specifically configured to:

obtain an identifier of a target object; and use a rotational symmetry degree of freedom corresponding to the identifier of the target object as a rotational symmetry degree of freedom of the target object.

Optionally, the first obtaining module 1001 is specifically configured to:

obtain a rotational symmetry degree of freedom of the target object input by a user.

Optionally, the first obtaining module 1001 specifically includes:

a first obtaining subunit, configured to obtain the identifier of the target object;

a second obtaining subunit, configured to obtain a 3D model corresponding to the identifier of the target object;

a rendering unit, configured to obtain a plurality of 2D images of the target object through rendering based on the 3D model; and an analysis unit, configured to obtain the rotational symmetry degree of freedom of the target object by performing similarity calculation and clustering analysis on the plurality of 2D images.

Optionally, the analysis unit is specifically configured to:

sample the plurality of 2D images based on a plurality of rotational symmetry degrees of freedom, to obtain a plurality of image pairs, where each of the rotational symmetry degrees of freedom corresponds to at least one image pair;

calculate similarities of all the plurality of image pairs;

perform clustering analysis on the plurality of image pairs based on the similarities and the rotational symmetry degrees of freedom, to obtain a plurality of image sets, where a difference between a highest similarity of all image pairs in an image set and a lowest similarity of all the image pairs in the image set is less than or equal to a preset value, and all the image pairs in the image set have a same rotational symmetry degree of freedom;

determine an image set having a largest quantity of image pairs in the plurality of image sets as a target image set; and when a lowest similarity of all image pairs in the target image set is greater than a similarity threshold, determine a rotational symmetry degree of freedom corresponding to the target image set as the rotational symmetry degree of freedom of the target object.

Optionally, each of the image pairs includes two 2D images. When the rotational symmetry degree of freedom is N, first rendering angles of the two 2D images included in the image pair differ by 360/N degrees.

Optionally, second rendering angles of the plurality of 2D images are the same, and the analysis unit is specifically configured to:

obtain 2D images at a plurality of different second rendering angles of the 3D model through rendering;

sample the 2D images at the plurality of different second rendering angles based on the rotational symmetry degree of freedom corresponding to the target image set, to obtain image pairs at the plurality of different second rendering angles; and when similarities of the image pairs at the plurality of different second rendering angles are all greater than the similarity threshold, determine that the target object has rotational symmetry, and determine the rotational symmetry degree of freedom corresponding to the target image set as the rotational symmetry degree of freedom of the target object.

Optionally, the second obtaining module 1002 is specifically configured to:

input image data obtained by photographing the target object into a pose detection classifier; and analyze the image data by using the pose detection classifier to obtain the pose information of the target object, where the pose detection classifier is obtained by training images of the target object based on the rotational symmetry degree of freedom.

Optionally, the pose information includes 6-DoF pose information (x,y,z,yaw, pitch,roll), where x represents front-to-back displacement, y represents left-to-right displacement, z represents up-to-down displacement, yaw represents a yaw angle, pitch represents a pitch angle, and roll represents a roll angle. The adjustment module 1003 is specifically configured to:

determine pose information other than the yaw angle in the pose information of the target object as the adjusted pose information, where the yaw angle is an angle at which the target object rotates around a rotational axis; and when the rotational symmetry degree of freedom of the target object is 0 degrees, determine that a yaw angle in the adjusted pose information is 0 degrees; or when the rotational symmetry degree of freedom of the target object is not 0 degrees, determine a yaw angle in the adjusted pose information according to the following formula:

$$yaw_2 = \begin{cases} yaw_1, & yaw_1 \in \left[0, \frac{360}{N}\right) \\ yaw_1 - t * \frac{360}{N}, & yaw_1 \in \left[\frac{360}{N} * t, \frac{360}{N} * (t+1)\right), t = \lfloor yaw_1 * N / 360 \rfloor \end{cases},$$

where $yaw_2$ represents the yaw angle in the adjusted pose information, $yaw_1$ represents the yaw angle in the pose information of the target object, and N represents the rotational symmetry degree of freedom of the target object.

Optionally, the apparatus further includes:

a display module, configured to display a virtual object based on the adjusted pose information.

Optionally, the rendering unit is specifically configured to:

determine a plurality of first coordinate points from a coordinate system, where a first included angle of each of the first coordinate points is 0 degrees, a second included angle of each of the first coordinate points is greater than 0 degrees and less than or equal to a preset angle, the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, the target plane is a plane on which the second coordinate axis and a third coordinate axis are located, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis;

obtain first reference images by rendering the 3D model by using all the plurality of first coordinate points as observation positions;

determine, as a second rendering angle, a second included angle of a first coordinate point corresponding to a first reference image with a largest area in the plurality of obtained first reference images; and obtain 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the second rendering angle.

In this embodiment of this application, the rotational symmetry degree of freedom of the target object and the pose information of the target object are obtained. Then, the pose information of the target object is adjusted based on the rotational symmetry degree of freedom to obtain the adjusted pose information, where the adjusted pose information is used for displaying the virtual object, and the virtual object is an object associated with the target object. In this way, pose information of the virtual object can be adaptively adjusted based on the rotational symmetry degree of freedom of the target object, so that a virtual-real fusion display result may be displayed at an optimal display angle relative to a camera. This improves viewing experience of users.

It should be noted that, when the apparatus for obtaining pose information provided in the foregoing embodiment obtains pose information, division into the foregoing functional modules is merely an example for description. During actual application, the foregoing functions may be allocated to different functional modules and implemented as required, that is, an inner structure of the apparatus is divided into different functional modules to implement all or some of the functions described above. In addition, the apparatus for obtaining pose information provided in the foregoing embodiment and the method for obtaining pose information provided in the embodiment are based on a same concept. For a specific implementation process, refer to the method embodiment. Details are not described herein again.

Figure 11:
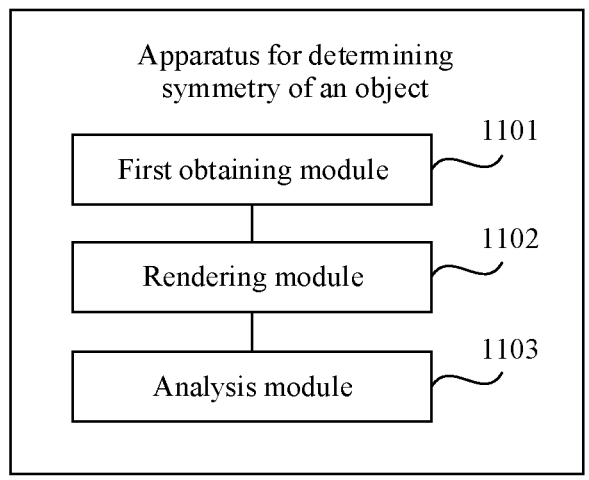
FIG. 11 is a schematic diagram depicting a structure of an apparatus for determining symmetry of an object according to an embodiment of this application.

FIG. 11 is a schematic diagram depicting a structure of an apparatus for determining symmetry of an object according to an embodiment of this application. The apparatus may be implemented as a part or all of a computer device by using software, hardware, or a combination thereof. The computer device may be the apparatus shown in FIG. 4. Refer to FIG. 11. The apparatus includes a first obtaining module 1101, a rendering module 1102, and an analysis module 1103.

The first obtaining module 1101 is configured to perform step 501 in the embodiment in FIG. 5.

The rendering module 1102 is configured to perform step 502 in the embodiment in FIG. 5.

The analysis module 1103 is configured to perform step 503 in the embodiment in FIG. 5.

Optionally, the analysis module 1103 specifically includes:

a sampling unit, configured to sample a plurality of 2D images based on a plurality of rotational symmetry degrees of freedom, to obtain a plurality of image pairs, where each of the rotational symmetry degrees of freedom corresponds to at least one image pair;

a calculation unit, configured to calculate similarities of all the plurality of image pairs;

a clustering unit, configured to perform clustering analysis on the plurality of image pairs based on the similarities and the rotational symmetry degrees of freedom, to obtain a plurality of image sets, where a difference between a highest similarity of all image pairs in an image set and a lowest similarity of all the image pairs in the image set is less than or equal to a preset value, and all the image pairs in the image set have a same rotational symmetry degree of freedom;

a first determining unit, configured to determine an image set having a largest quantity of image pairs in the plurality of image sets as a target image set; and a second determining unit, configured to: when a lowest similarity of all image pairs in the target image set is greater than a similarity threshold, determine a rotational symmetry degree of freedom corresponding to the target image set as the rotational symmetry degree of freedom of the target object.

Optionally, each of the image pairs includes two 2D images. When the rotational symmetry degree of freedom is N, first rendering angles of the two 2D images included in the image pair differ by 360/N degrees.

Optionally, second rendering perspectives of the plurality of 2D images are the same, and the second determining unit is specifically configured to:

obtain 2D images at a plurality of different second rendering angles of the 3D model through rendering;

sample the 2D images at the plurality of different second rendering angles based on the rotational symmetry degree of freedom corresponding to the target image set, to obtain image pairs at the plurality of different second rendering angles; and when similarities of the image pairs at the plurality of different second rendering angles are all greater than the similarity threshold, determine that the target object has rotational symmetry, and determine the rotational symmetry degree of freedom corresponding to the target image set as the rotational symmetry degree of freedom of the target object.

Optionally, the rendering module 1102 is specifically configured to:

determine a plurality of first coordinate points from a coordinate system, where a first included angle of each of the first coordinate points is 0 degrees, a second included angle of each of the first coordinate points is greater than 0 degrees and less than or equal to a preset angle, the first included angle is an included angle between a projection of a line connecting a coordinate point and the origin on a target plane and a positive side of a second coordinate axis, the second included angle is an included angle between the line connecting the coordinate point and the origin and a positive side of a first coordinate axis, the target plane is a plane on which the second coordinate axis and a third coordinate axis are located, the origin of the coordinate system is a center point of the 3D model, the first coordinate axis of the coordinate system is a rotational axis of the 3D model, the second coordinate axis of the coordinate system is perpendicular to the first coordinate axis, and the third coordinate axis of the coordinate system is perpendicular to both the first coordinate axis and the second coordinate axis;

obtain first reference images by rendering the 3D model by using all the plurality of first coordinate points as observation positions;

determine, as a second rendering angle, a second included angle of a first coordinate point corresponding to a first reference image with a largest area in the plurality of obtained first reference images; and obtain 2D images by rendering the 3D model by using all of a plurality of second coordinate points in the coordinate system as observation positions, where a first included angle of each of the second coordinate points is a first rendering angle, the first rendering angle of each of the second coordinate points is greater than 0 degrees and less than or equal to 360 degrees, and a second included angle of each of the second coordinate points is the second rendering angle.

Optionally, the apparatus further includes:

a second obtaining module, configured to obtain pose information of the target object; and an adjustment module, configured to adjust the pose information of the target object based on the rotational symmetry degree of freedom to obtain adjusted pose information, where the adjusted pose information is used for displaying a virtual object, and the virtual object is an object associated with the target object.

Optionally, the second obtaining module is specifically configured to:

input image data obtained by photographing the target object into a pose detection classifier; and analyze the image data by using the pose detection classifier to obtain the pose information of the target object, where the pose detection classifier is obtained by training images of the target object based on the rotational symmetry degree of freedom.

Optionally, the apparatus further includes:

a third obtaining module, configured to obtain a plurality of images of the target object and pose information of the target object in each of the images;

a selection module, configured to select, from the plurality of images, images whose yaw angles in pose information are greater than 0 degrees and less than a rotation angle as training images, where the rotation angle is a ratio of 360 degrees to the rotational symmetry degree of freedom of the target object; and a training module, configured to train a to-be-trained detection model by using the plurality of selected training images as input samples and by using pose information of the target object in each of the plurality of training images and an identifier of the target object as sample labels, to obtain the pose detection classifier.

Optionally, the pose information includes 6-DoF pose information (x,y,z,yaw, pitch,roll), where x represents front-to-back displacement, y represents left-to-right displacement, z represents up-to-down displacement, yaw represents a yaw angle, pitch represents a pitch angle, and roll represents a roll angle.

The adjustment module is specifically configured to:

determine pose information other than the yaw angle in the pose information of the target object as the adjusted pose information, where the yaw angle is an angle at which the target object rotates around a rotational axis; and when the rotational symmetry degree of freedom of the target object is 0 degrees, determine that a yaw angle in the adjusted pose information is 0 degrees; or when the rotational symmetry degree of freedom of the target object is not 0 degrees, determine a yaw angle in the adjusted pose information according to the following formula:

$$yaw_2 = \begin{cases} yaw_1, yaw_1 \in \left[0, \frac{360}{N}\right) \\ yaw_1 - t * \frac{360}{N}, yaw_1 \in \left[\frac{360}{N} * t, \frac{360}{N} * (t+1)\right), t = \lfloor yaw_1 * N / 360 \rfloor \end{cases},$$

where $yaw_2$ represents the yaw angle in the adjusted pose information, $yaw_1$ represents the yaw angle in the pose information of the target object, and represents the rotational symmetry degree of freedom of the target object.

Optionally, the apparatus further includes:

a display module, configured to display the virtual object based on the adjusted pose information.

In this embodiment of this application, after the 3D model of the target object is obtained, the plurality of 2D images of the target object are obtained through rendering based on the 3D model. Then, the rotational symmetry degree of freedom of the target object is obtained by performing similarity calculation and clustering analysis on the plurality of 2D images. In this way, whether the target object has rotational symmetry can be accurately identified, and the rotational symmetry degree of freedom of the target object can be obtained when the target object has rotational symmetry. This helps reduce difficulties in pose recognition for an object during pose detection and tracking, and improve accuracy of pose recognition for the object.

It should be noted that, when the apparatus for determining symmetry of an object provided in the foregoing embodiment determines symmetry of an object, division into the foregoing functional modules is merely an example for description. During actual application, the foregoing functions may be allocated to different functional modules and implemented as required, that is, an inner structure of the apparatus is divided into different functional modules to implement all or some of the functions described above. In addition, the apparatus for determining symmetry of an object provided in the foregoing embodiment and the method for determining symmetry of an object in the embodiment are based on a same concept. For a specific implementation process, refer to the method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or may be a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid state disk (Solid State Disk, SSD)), or the like.

The foregoing descriptions are the embodiments provided in this application, but are not intended to limit this application. Any modification, equivalent replacement, improvement, or the like made without departing from the spirit and principle of this application shall fall within the protection scope of this application.

What is claimed is:

1. A method for obtaining pose information, performed by at least one processor, wherein the method comprises:

obtaining a rotational symmetry degree of freedom of a target objectusing an identification of the target object;

obtaining pose information of the target object, the obtaining pose information of the target object comprising:

inputting image data obtained by photographing the target object into a pose detection classifier; and analyzing the image data by using the pose detection classifier to obtain the pose information of the target object;

determining, based on the rotational symmetry degree of freedom of the target object and a yaw angle in the pose information of the target object, that the pose information of the target object needs to be adjusted; and in response to the determining that the pose information needs to be adjusted, adjusting the pose information of the target object based on the rotational symmetry degree of freedom to obtain adjusted pose information, wherein the adjusted pose information is pose information of a virtual object, and the virtual object is an object associated with the target object, wherein the pose detection classifier is obtained by training images of the target object based on the rotational symmetry degree of freedom, and wherein the pose information is determined to need to be adjusted when the rotational symmetry degree of freedom of the target object is 0 degrees but the yaw angle is not 0 degrees, or when the rotational symmetry degree of freedom of the target object is not 0 degrees and the yaw angle is not within [0, 360/N], where N represents the rotational symmetry degree of the target object.

2. The method according to claim 1, wherein the obtaining the rotational symmetry degree of freedom of the target object comprises:

obtaining the identification of the target object; and using a rotational symmetry degree of freedom corresponding to the identification of the target object as the rotational symmetry degree of freedom of the target object.

3. The method according to claim 1, wherein the obtaining the rotational symmetry degree of freedom of the target object comprises:
  obtaining a rotational symmetry degree of freedom of the target object input by a user.

4. The method according to claim 1, wherein the obtaining the rotational symmetry degree of freedom of the target object comprises:
  obtaining the identification of the target object;
  obtaining a three-dimensional (3D) model corresponding to the identification of the target object;
  obtaining a plurality of two-dimensional (2D) images of the target object through rendering based on the 3D model; and
  obtaining the rotational symmetry degree of freedom of the target object by performing similarity calculation and clustering analysis on the plurality of 2D images.

5. The method according to claim 1, wherein the method further comprises:
  when the rotational symmetry degree of freedom of a second target object is 0 degrees and a yaw angle is 0 degrees, determining that the pose information of the second target object does not need to be adjusted; or
  when the rotational symmetry degree of freedom of a second target object is not 0 degrees and a yaw angle satisfies $$yaw_1 \in \left[0, \frac{360}{N}\right),$$

determining that the pose information of the second target object does not need to be adjusted, wherein yaw1 represents the yaw angle in the pose information of the target object, and N represents the rotational symmetry degree of freedom of the target object.

6. The method according to claim 1, wherein the method further comprises:
  displaying the virtual object based on the adjusted pose information.

7. The method according to claim 6, wherein the method further comprises:
  determining that a second target object does not have rotational symmetry degree of freedom, and in response displaying a second virtual object associated with the second target object based on the pose information of the second target object; or
  when the pose information of the second target object does not need to be adjusted, displaying the second virtual object based on the pose information of the second target object.

8. An apparatus for obtaining pose information, wherein the apparatus comprises a processor, a memory, and a communications interface, the processor receives or sends information through the communications interface, and the processor is configured, when invoking program instructions stored in the memory, to implement the following steps:
  obtaining pose information of the target object, the obtaining pose information of the target object using an identification of the target object, and comprising:
    inputting image data obtained by photographing the target object into a pose detection classifier; and
    analyzing the image data by using the pose detection classifier to obtain the pose information of the target object;
    determining, based on the rotational symmetry degree of freedom of the target object and a yaw angle in the pose information of the target object, that the pose information of the target object needs to be adjusted; and
  in response to the determining that the pose information needs to be adjusted, adjusting the pose information of the target object based on the rotational symmetry degree of freedom to obtain adjusted pose information, wherein the adjusted pose information is pose information of a virtual object, and the virtual object is an object associated with the target object,
  wherein the pose detection classifier is obtained by training images of the target object based on the rotational symmetry degree of freedom, and
  wherein the pose information is determined to need to be adjusted when the rotational symmetry degree of freedom of the target object is 0 degrees but the yaw angle is not 0 degrees, or when the rotational symmetry degree of freedom of the target object is not 0degrees and the yaw angle is not within [0, 360/N], where N represents the rotational symmetry degree of the target object.

9. The apparatus according to claim 8, wherein the processor is further configured, when invoking the program instructions, to:
  obtain an identification of the target object; and
  use a rotational symmetry degree of freedom corresponding to the identification of the target object as the rotational symmetry degree of freedom of the target object.

10. The apparatus according to claim 8, wherein the processor is further configured, when invoking the program instructions, to:
  when the rotational symmetry degree of freedom of the target object is 0 degrees and a yaw angle is not 0 degrees, determine that the pose information of the target object needs to be adjusted; and
  when the rotational symmetry degree of freedom of the target object is not 0 degrees and a yaw angle is not within [0, 360/N), determine that the pose information of the target object needs to be adjusted, wherein N is the rotational symmetry degree of freedom of the target object.

* * * * *